US012353179B1

(12) United States Patent
Drilling et al.

(10) Patent No.: US 12,353,179 B1
(45) Date of Patent: Jul. 8, 2025

(54) DEVICE GROUP SYNCHRONIZATION

(71) Applicant: Amazon Technologies, Inc., Seattle, WA (US)

(72) Inventors: Jacob Charles Drilling, Seattle, WA (US); Amit Gupta, Seattle, WA (US); Rohit Ravindra Patil, Seattle, WA (US); Mark Aiken, Seattle, WA (US); Vignesh Viswanat Natraj, Seattle, WA (US); Michael Chorey, Bellingham, WA (US); Parth Narendra Acharya, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 17/956,004

(22) Filed: Sep. 29, 2022

Related U.S. Application Data

(60) Provisional application No. 63/390,540, filed on Jul. 19, 2022.

(51) Int. Cl.
*G05B 15/02* (2006.01)
*G10L 15/22* (2006.01)

(52) U.S. Cl.
CPC .............. *G05B 15/02* (2013.01); *G10L 15/22* (2013.01); *G10L 2015/223* (2013.01)

(58) Field of Classification Search
CPC .... G05B 15/02; G10L 15/22; G10L 2015/223
See application file for complete search history.

(56) References Cited

U.S. PATENT DOCUMENTS

| 9,940,090 | B2* | 4/2018 | Kohara | G06F 3/165 |
|---|---|---|---|---|
| 2007/0297459 | A1* | 12/2007 | Cucos | H04J 3/07 |
| | | | | 370/505 |
| 2009/0222520 | A1* | 9/2009 | Sloo | H04N 21/6581 |
| | | | | 709/205 |
| 2013/0251329 | A1* | 9/2013 | McCoy | H04N 21/44004 |
| | | | | 386/E5.032 |
| 2013/0346859 | A1* | 12/2013 | Bates | G06F 3/0482 |
| | | | | 715/716 |
| 2014/0010515 | A1* | 1/2014 | Lee | H04N 21/44227 |
| | | | | 386/207 |
| 2015/0100143 | A1* | 4/2015 | Gao | H04H 20/18 |
| | | | | 700/94 |
| 2018/0196630 | A1* | 7/2018 | Kohara | G06F 3/165 |
| 2023/0076970 | A1* | 3/2023 | Coburn, IV | H04N 21/43076 |

* cited by examiner

*Primary Examiner* — Tadesse Hailu
(74) *Attorney, Agent, or Firm* — Pierce Atwood LLP

(57) ABSTRACT

Techniques for synchronizing device group data across different device control applications are described. A device group may include two or more smart home devices that may be controlled/supported by different device control applications. A user may set up device groups, including the same devices, in the different device control applications. A system may include a group synchronization service that synchronizes (e.g., merges) the multiple device groups across the different device control applications. The groups may be synchronized based on matching group names, matching devices included in the group, etc. After the device groups are synchronized, modifications made by the user to a device group in one device control application may be propagated to other device control applications.

20 Claims, 11 Drawing Sheets

DEVICE GROUP SYNCHRONIZATION

CROSS-REFERENCE TO RELATED APPLICATION

This application claims the benefit of and priority to U.S. Provisional Patent Application No. 63/390,540, filed Jul. 19, 2022, and entitled "SMART HOME MANAGEMENT WITH SPEECH CONTROL," in the names of Marja Koopmans, et al. The above provisional application is herein incorporated by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
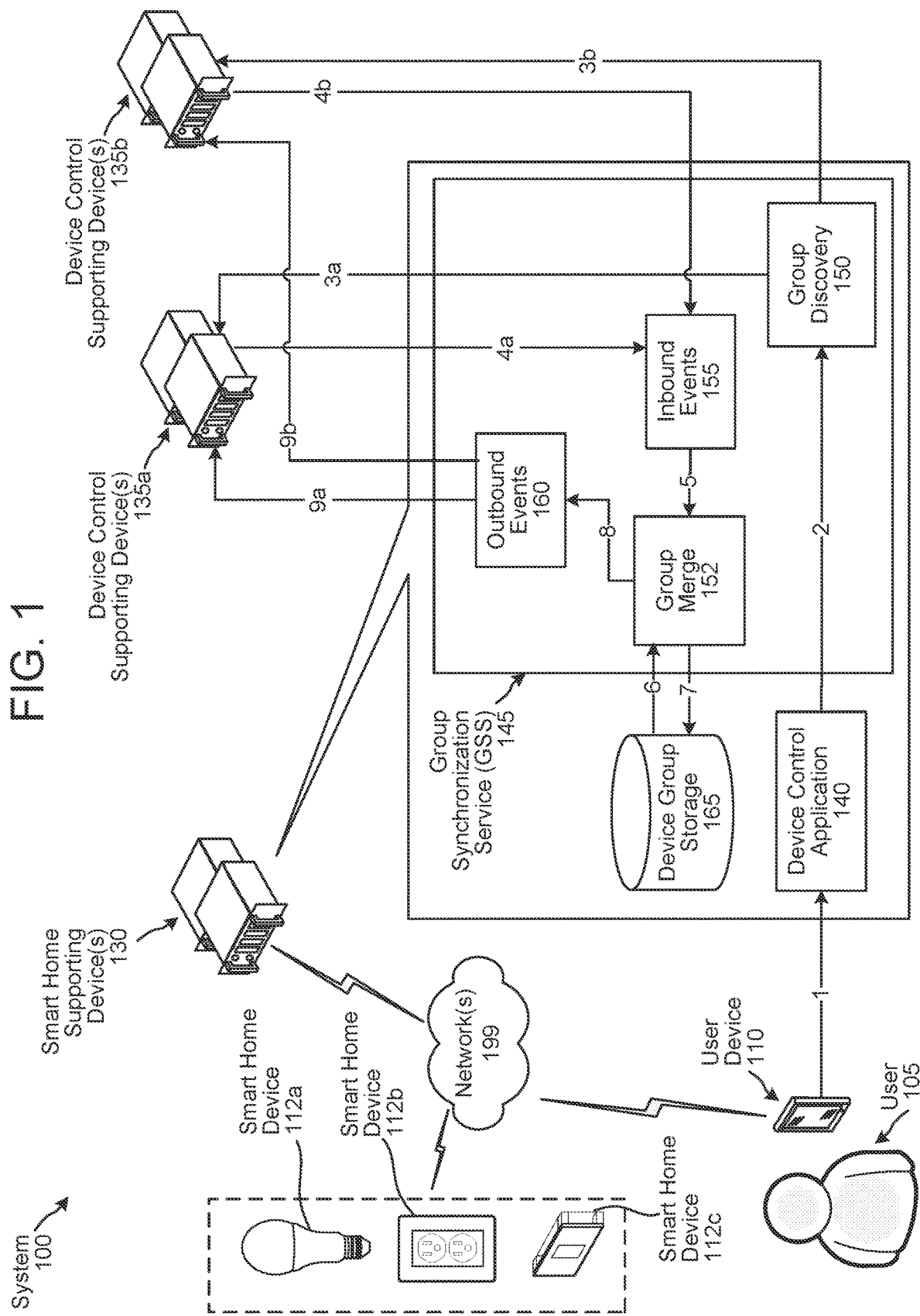
FIG. 1 is a conceptual diagram illustrating a system for synchronizing device group data across different device control systems, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

An environment (e.g., a house, an apartment, an office, a store, a hotel lobby, etc.) may include one or more smart home devices. As used herein, a "smart home device" refers to a device that may be controlled by another device or system in response to receiving a user input (e.g., a spoken input, an input via a GUI, a gesture input, etc.). Example smart home devices include, but are not limited to, light switches, TVs, plugs, outlets, light bulbs, motion sensors, speakers, door locks, window locks, garage doors, security cameras, home monitoring devices, ovens, microwaves, washers, dryers, temperature sensors, and thermostats.

An environment can include smart home devices that are controlled by different systems. Some smart home devices may be controlled using a first device control system, via a first device control application provided by the first system, while other smart home devices may be controlled using a second, different, device control system, via a second device control application provided by the second system. For example, a user's house may include an outlet that can be controlled using an Amazon Alexa application and light bulbs that can be controlled using a Philips Hue application. In this example, Amazon Alexa may represent one device control system and Philips Hue may represent another device control system.

A user can group two or more smart home devices, which is referred to herein as a "device group", to control the devices in the group together (e.g., using one input, operating in a synchronized manner, etc.). The devices may be of different types. For example, a first device group may include light bulbs and an outlet, and the user may provide a single input that causes the light bulbs and the outlet in the first device group to turn on. As another example, a second device group may include a right speaker, a left speaker, and a sub-woofer, and the second device group may output audio in a synchronized manner.

A device group can include smart home devices that are controlled by different systems. When the device group includes devices controllable by different systems, users may have to manage the device group in the corresponding different applications installed at a user device(s). For example, if a user created a device group using a first device control application and a second device control application, any time the user modifies the device group (e.g., changes the group name, adds/removes devices, changes device settings, changes group settings, etc.), the user has to separately cause data to be input into the first and second device control applications in order to carry through the group change to both applications. This can result in a fragmented experience, in particular, when device group information (e.g., group name, devices within the group, etc.) is different in different applications.

The present disclosure relates to techniques for synchronizing device group data across multiple different device control systems. In some embodiments, after a user approves device group synchronization across different device control systems, a system requests the device control systems to provide device group data associated with the user, and the system processes various device group data, associated with different device control systems, to determine whether two or more device groups correspond to one another and should be merged. The techniques described herein enable synchronization of device group names and device group members based on, for example, determining that the device group names are the same or similar, and/or that the device group members are the same or similar (for example based on device identifiers or the like). For example, a device group named "Living Room" in a first device control system and a device group named "livingroom" in a second device control system may be determined to correspond to each other. As another example, a first device group including devices A, B, C may be determined to correspond to a second device group including the same devices A, B, C.

Device groups from different device control systems may be merged to form one device group, or may be kept as separate device groups. In some cases, two device groups that are merged may have the same number of members that correlate with the same devices. In other cases, two device groups that are merged may have different number of members or correlate with different devices, and the merged group may include devices from both groups.

The system described herein can also propagate modifications to a device group that are made by a user in one device control system to other device control systems that the user uses to control smart home devices, without the user expressly replicating the changes in the other device control applications.

Teachings of the present disclosure provide, among other things, an improved user experience by synchronizing device group information across different device control systems, and enabling control of smart home devices, supported by different device control systems, via one of the device control application.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for synchronizing device group data across different device control applications/systems, according to embodiments of the present disclosure. The system 100 may include a user device 110, local to a user 105, in communication with a smart home supporting device(s) 130 via a network(s) 199. The system 100 may further include one or more smart home devices 112, such as a light bulb 112*a*, an outlet 112*b*, a light switch 112*c*, etc. One or more of the smart home device(s) 112 may be in communication with the smart home supporting device(s) 130, the user device 110, and/or the device control supporting device(s) 135 via the network(s) 199. The network(s) 199 may include any combination of the Internet and/or any other wide- or local-area network, and may include wired, wireless, and/or cellular network hardware. In some embodiments, one or more of the smart home devices 112 may be in communication with the user device 110 via a private network (e.g., a home network), Bluetooth, Near Field Communication (NFC), etc. Although the figures and discussion of the present disclosure illustrate certain steps in a particular order, the steps described may be performed in a different order (as well as certain steps removed or added) without departing from the present disclosure.

The user device 110 may include or may be in communication with one or more components that enable the user 105 to operate the smart home device(s) 112. Some smart home devices 112 may also include components that enable the user 105 to operate the smart home device 112. A device group, as used herein, may include a combination of user devices 110 and/or smart home devices 112. Example smart home devices 112 include, but are not limited to, light switches, TVs, plugs, outlets, light bulbs, motion sensors, speakers, door locks, window locks, garage doors, security cameras, home monitoring devices, ovens, microwaves, washers, dryers, temperature sensors, and thermostats. The smart home devices 112 may also include smart devices outside a home that may be in a different environment (such as an office, a hotel room, a lobby, a store, a vehicle, etc.). Control of the smart home devices 112 may include control of device components attached to or in communication with the smart home device 112, such as, device sensors (e.g., gas tank sensor, tire pressure sensor, fridge door sensor, front door sensor, temperature sensors, etc.), device timers (e.g., washing machine timer, oven timer, etc.), and other components (e.g., washing machine settings, vehicle speakers, vehicle controls, etc.).

More than one environment, which may be referred to as "premises", may be associated with the user 105, where individual premises may include different sets of smart home devices 112 and/or user devices 110. For example, the user 105 may have a primary home, including a first set of devices, a vacation home including a second set of devices, a vehicle including a third set of devices, etc.

The smart home supporting device(s) 130 may include various components. With reference to FIG. 1, the smart home supporting device(s) 130 may include a device control application 140, a device group storage 165, and a group synchronization service (GSS) 145. The device control application 140 may receive user inputs, via, for example, a corresponding application on the user device 110, that enables control of the device(s) 110, 112. The corresponding application on the user device 110 may provide a user interface for the user 105 to provide various inputs, such as authorization for synchronizing device groups, adding or removing devices 110, 112, modifying settings for the devices 110, 112, etc. In some embodiments, some of the functionalities described as being performed by the device control application 140 may be performed by the corresponding application on the user device 110. The device control application 140 may be a first device control application that can be used to control a particular set of devices 110, 112. Control of a device 110, 112 by the device control application 140 may depend on device configurations for the device 110, 112, such as device type, device manufacturer, device settings, etc.

The system 100 may also include one or more device control supporting device(s) 135, which are in communication with the smart home supporting device(s) 130. The device control supporting device(s) 135 may also be in communication with the user device 110 via the network(s) 199 (although not shown). The device control supporting device(s) 135 may include or support another device control application(s) (e.g., device control application 450 shown in FIG. 4), separate from the device control application 140, that can be used to control another set of devices 110, 112 (depending on, for example, device configurations for the device 110, 112). For example, a first smart home device 112a may be controllable using the device control application 140, a second smart home device 112b may be controllable using the device control application 450 of the device control supporting device(s) 135, etc. Some devices may be controllable using more than one device control application, depending on how the user 105 configures the device. The functionalities of the device control supporting device(s) 135 may be provided as a skill component (e.g., skill component(s) 690, skill supporting device(s) 625), an application, or other system components, The user device 110 may include a first application corresponding to the smart home device supporting device(s) 130 that enables the user 105 to control first smart home devices 112 (e.g., Amazon Alexa compatible devices). The user device 110 may further include a second separate application corresponding to the device control supporting device(s) 135 that enables the user 105 to control second smart home devices 112 (e.g., Philips Hue compatible devices). In some embodiments, the first smart home devices 112 and the second smart home devices 112 may include overlapping devices, for example, a light bulb 112a that can be controlled using both of the supporting device(s) 130 and 135. Some operations of the smart home devices 112 may be enabled via the application(s) on the user device 110, without communications needed with the supporting devices 130, 135. For example, the user 105 may select a GUI button presented via a user interface of the application at the user device 110 to turn on the light bulb 112a. In some embodiments, the applications on the user device 110 may also perform functions of synchronizing device groups, as described herein.

Referring to FIG. 1, the user 105 may provide an input using the user device 110, where such input may be a spoken input, a typed input, selection of GUI element, a gesture input, etc. In some embodiments, the user device 110 may be displaying a user interface (UI) screen corresponding to the device control application 140, where the UI screen may be requesting permission, from the user 105, to synchronize device groups across different device control applications.

In some embodiments, the UI screen may show data identifying the different device control applications available in the system 100 for device group synchronization, where such device control applications may be systems, skills or other components (e.g., the device control supporting device(s) 135) that are registered or otherwise configured to operate in conjunction with the smart home supporting device(s) 130. In other embodiments, the UI screen may show data identifying the device control applications that the user 105 has access to based on, for example, the user 105 setting up/connecting the device control applications to a user profile of the user 105. The user profile may be stored in a profile storage 670/770 described below. In yet other embodiments, the device control applications shown to the user 105 may be ones that correspond to the smart home devices 112 within the user's environment.

The user device 110 may send (step 1 of FIG. 1) input data to the device control application 140, where the input data represents permission from the user 105 to synchronize device group data across different device control applications. The device control application 140 may send (step 2) the input data to a group discovery component 150 of the GSS component 145. In response to receiving the input data representing the permission, the GSS component 145 may initiate a device group synchronization process.

The device group synchronization process may involve the group discovery component 150 to send requests to one or more of the device control supporting device(s) 135. For example, the group discovery component 150 may send (step 3a) a first request to the device control supporting device(s) 135a for a first device control application, and may send (step 3b) a second request to the device control supporting device(s) 135b for a second device control application. The first request may be a request for device group data corresponding to one or more device groups associated with the user 105. The first request may include a user profile identifier corresponding to the user 105, where the user profile identifier may be used by the device control supporting device(s) 135a to identify the user 105. In some cases, the user profile identifier in the first request may be different than a user profile identifier used by the smart home supporting device(s) 130 (and a supporting device(s) 120 shown in FIGS. 6 and 7 and described below) to identify the user 105. The smart home supporting device(s) 130 may store data representing user profile identifiers for the user 105 for the different device control supporting device(s) 135. Similarly, the second request may include a user profile identifier corresponding to the user 105 and the device control supporting device(s) 135b. In some embodiments, the group discovery component 150 may send API requests to the device control supporting device(s) 135. The group discovery component 150 may send the requests to the device control supporting device(s) 135 associated with the user 105.

In response to receiving the first request, the device control supporting device(s) 135a may send (step 4a) first device group data corresponding to at least a first device group, where the first device group data may be received by an inbound events component 155 of the GSS 145. The first device group data may include a first device group identifier used by the device control supporting device(s) 135a to identify the first device group. The first device group data may also include one or more device identifiers (a first set of device identifiers) associated with (a first set of) smart home devices included in the first device group. The first device group data may also include a first group name, which may be a user-provided name for the first device group.

In response to receiving the second request, the device control supporting device(s) 135b may send (step 4b) second device group data corresponding to at least a second device group, and the second device group data may be received by the inbound events component 155. The second device group data may include a second device group identifier used by the device control supporting device(s) 135b to identify the second device group. The second device group data may also include one or more device identifiers (a second set of device identifiers) associated with (a second set of) smart home devices included in the second device group. The second device group data may also include a second group name, which may be a user-provided name for the second device group.

The inbound events component 155 may send (step 5) the first device group data and the second device group data (and other device group data received from other device control supporting device(s) 135 in response to requests from the group discovery component 150) to a group merge component 152 of the GSS 145. The group merge component 152 may be configured to determine device groups, from different device control applications, that correspond to one another, and merge them so that the device groups are synchronized across the different device control applications.

For merging the device groups, the group merge component 152 also retrieves (step 6) (third) device group data from the device group storage 165. The device group storage 165 may store device group data based on device groups created by the user 105 using the device control application 140/the smart home supporting device(s) 130. The third device group data may include a third device group identifier used by the smart home supporting device(s) 130 to identify the third device group. The third device group data may also include one or more device identifiers (a third set of device identifiers) associated with (a third set of) smart home devices included in the third device group. The third device group data may also include a third group name, which may be a user-provided name for the third device group.

The techniques described herein allow a user to synchronize device groups across multiple applications (e.g., Amazon Alexa, Philips Hue, Samsung Smart Things, etc.) without the user having to make the same change on all the applications. There may be conflicting or different device group information between the various device control applications, or device groups may share/have the same names but represent different groups in a user's environment. This can cause friction (e.g., undesired experience) for users as they may not be able to target the right/desired group in a particular application. The group merge component 152 may implement logic to handle device group conflicts to merge the device groups.

The group merge component 152 may process the (e.g., the first, the second and the third) device group data provided by one or more device control supporting device(s) 135 and the device group storage 165. The group merge component 152 may use one or more rules-based engines, one or more machine learning models, one or more statistical models, and/or other mechanisms to process the device group data and identify correlated groups (i.e., groups from different device control applications that are intended to control similar groupings of devices and/or spaces).

In some embodiments, the group merge component 152 may determine whether two (or more) device groups correspond to one another based on processing the respective device group names (provided by the user 105) for the device groups. In an example embodiment, the group merge component 152 may use a name matching algorithm, for example, the Levenshtein Distance algorithm (also known as the Edit distance-based algorithm). In example embodiments, the Levenshtein Distance algorithm may compute the number of edits required to transform one string (e.g., a first device group name) to another (e.g., a second device group name). The edits count the following as an operation: insertion of a character; deletion of a character; and substitution of a character. The larger the number of operations to match the strings, the less the similarity between the two strings. The Levenshtein Distance algorithm can be used to measure the similarity between the device group names of different lengths well. Another (or additional) example algorithm that may be implemented by the group merge component 152 may be the Jaccard Similarity algorithm, which involves determining a coefficient that measures the similarity between finite sample sets, and is defined as the size of the intersection divided by the size of the union of the sample sets. The sample sets may correspond to common device group names (e.g., living room, kitchen, hotel lobby, dining room, bathroom, children's room, [person's name] room, outdoors, hallway, etc.). Another (or additional) example algorithm that may be implemented by the group merge component 152 may be the Normalized Hamming Distance algorithm, which involves determining a percentage representing a dissimilarity of two strings/device group names. A lower value of Normalized Hamming distance means the two strings are more similar.

In some embodiments, the group merge component 152 may determine that two device group names correspond to one another based on a similarity (e.g., character similarity, semantic similarity, or the like) of the device group names. For example, the device group names "Living Room" and "Family Room" may be determined to correspond to the same device group.

The group merge component 152 may determine whether smart home devices in a device group correspond (e.g., match, are the same, are similar, etc.) to the smart home devices in another device group. Such determination may be based on a device type of the smart home device, a user-provided name for the smart home device, a device identifier for the smart home device, etc. In analyzing the device names, the group merge component 152 may use a name matching algorithm, a semantic similarity algorithm, a rules-based engine, and/or other models described herein. As an example, a first device name "bedroom lights" and a second device name "bedroom light" may be determined to correspond to the same smart home device.

These merge techniques can be used in varying combinations, priorities, and hierarchies. For example, where groups from at least one device control application have generic names like "Group 1" and "Group 2" these names may be discounted for purposes of matching and the names of the devices can be matched against each other or the groups of another device control application. For example, if the devices in "Group 1" include "bedroom light" then the name of the device can be matched against a "bedroom" group from the other device control application. Similar matching can be done across group and device sets such that similarities that meet a defined threshold can be determined to be 'matches.'

The group merge component 152 may implement rules to merge two device groups. Some example rules and scenarios are described below using "G" to denote a device group and (A, B, C, D, X, etc.) to denote smart home devices included in a group G.

In one example scenario, the device group storage 165 may not have a device group corresponding to a first device group provided by the device control supporting device(s) 135*a*. For example, the device control supporting device(s) 135*a* may send data indicating group G1=(A, B, C), and the merged group may be G1=(A, B, C). The GSS 145, in this scenario, may implement a rule that a merged group is based on a received group information where there is no prior matching group in the device group storage 165. The GSS 145 may also create a device group in the smart home supporting device(s) 130 by storing, in the device group storage 165, device group data representing G1=(A, B, C).

The device group data may include a device group identifier, a set of device identifiers corresponding to the smart home devices A, B, C, a user-provided device group name, and/or user-provided device names. The device group data may also include a device group identifier used by the device control supporting device(s) 135a to identify the group G1.

In another example scenario, the device control supporting device(s) 135a may provide a device group including a device (device C) that is not included in a device group provided by the device group storage 165, but the device C is identifiable by the smart home supporting device(s) 130. For example, the device group storage 165 may provide G1=(A, B) and the device control supporting device(s) 135a may provide G2=(A, B, C). The group merge component 152 may determine the merged group G3=(A, B, C) based on the device C being identifiable (e.g., the device being connected to the user profile of the user 105) by the smart home supporting device(s) 130. The GSS 145, in this scenario, may implement a rule that a merged group includes a device in received group information where there is no matching device in a group in the device group storage 165, and the device is discoverable by the smart home supporting device(s) 130. The GSS 145 may store, in the device group storage 165, device group data representing the group G3.

In yet another example scenario, the device control supporting device(s) 135a may provide a device group including a device (device D) that is not included in a device group provided by the device group storage 165, and the device D is not identifiable by the smart home supporting device(s) 130. For example, the device group storage 165 may provide G1=(A, B) and the device control supporting device(s) 135a may provide G2=(A, B, D). The group merge component 152 may determine the merged group G3=(A, B) based on the device D not being identifiable by the smart home supporting device(s) 130. In this scenario, the GSS 145 may implement a rule that a merged group does not include a device in received group information where there is no matching device in a group in the device group storage 165 and the device is not discoverable by the smart home supporting device(s) 130. Other components of the smart home supporting device(s) 130 may perform certain operations to identify the device D (e.g., request the user 105 to add the device D to the user profile, request the user to confirm device D is to be added, request the user 105 to add an application/skill that controls the device D, etc.). The GSS 145 may not store additional data in the device group storage 165, since the group G1 already matched the merged group G3. The GSS 145 may communicate device group data representing the group G3 to the device control supporting device(s) 135a as described below via an outbound events component 160.

In yet another example scenario, the device group provided by the device group storage 165 may include an additional device than the device group provided by the device control supporting device(s) 135a. For example, the device group storage 165 may provide G1=(A, B, C) and the device control supporting device(s) 135a may provide G2=(A, B). The group merge component 152 may determine the merged group G3=(A, B, C). In this scenario, the GSS 145 may implement a rule that a merged group includes a device in a group in the device group storage 165 where there is no matching device in a received group information. The GSS 145 may not store additional data in the device group storage 165, since the group G1 already matches the merged group G3. The GSS 145 may communicate device group data representing the group G3 to the device control supporting device(s) 135a as described below.

In another example scenario, the device groups provided by the device group storage 165 and the device control supporting device(s) 135a may have the same group name, but may include different devices. For example, the device group storage 165 may provide G1=(X) and the device control supporting device(s) 135a may provide G2=(A, B). The group merge component 152 may determine the merged group G3=(A, B, X). As another example, the device group storage 165 may provide G1=(A, B, C) and the device control supporting device(s) 135a may provide G2=(C, D, E). The group merge component 152 may determine the merged group G3=(A, B, C, D, E). The GSS 145, in these scenarios, may implement a rule that a merged group includes devices in received group information and devices in a group in the device group storage 165, when the group names are the same (e.g., are an exact word match, are a semantic match, match to a certain extent (e.g., 98% matching), etc.) The GSS 145 may store, in the device group storage 165, device group data representing the group G3, and may communicate the device group data representing G3 to the device control supporting device(s) 135a.

In another example scenario, the device groups provided by the device group storage 165 and the device control supporting device(s) 135a may have different device group names, but may include the same devices. For example, the device group storage 165 may provide G1=(A, B, C) and the device control supporting device(s) 135a may provide G2=(A, B, C). The group merge component 152 may determine the merged group G3=(A, B, C). In some cases, the merged group G3 may retain the G1 group name. In other cases, the device control application 140 may ask the user 105 to provide a name for the merged group G3. The GSS 145, in this scenario, may implement a rule that groups are merged when they include the same devices. The GSS 145 may store, in the device group storage 165, device group data representing the group G3 with the group name, and may communicate the device group data representing G3 and the group name to the device control supporting device(s) 135a.

In yet another example scenario, the device group storage 165 may include a first device group with a first name and a second device group with a second name, and the device control supporting device(s) 135a may provide a device group with the same/similar name as the second device group, but including devices of the first device group. For example, the device group storage 165 may provide G1=(A, B) and G2=(C, D), and the device control supporting device(s) 135a may provide G3=(A, B) that has the same name as the group G2. The group merge component 152 may determine the merged group as G4=(A, B), which may be communicated to the device control supporting device(s) 135a as replacing the group G3, and may be used to replace G1 in the device group storage 165. In this scenario, the GSS 145 may implement a rule that groups are merged based on included devices, rather than group names.

The group merge component 152 may also determine the name for the merged group. In one example, the group merge component 152 may use the group name provided by the device group storage 165. In another example, one of the device group names is misspelled, then the properly spelled device group name may be used for the merged group (e.g., "livingroom" vs. "living room"). Any set of rules to prefer one device group name based on source, format, specificity, or similar aspects can be defined and applied by the GSS 145.

In some cases, when the device group names are not the same/similar, and/or the devices in the groups are not the same/similar, then the GSS 145 may ask the user 105 to confirm whether two device groups are to be merged.

In some embodiments, the group merge component 152 may also select/reconcile device names for the devices in the merged group, when the devices have different names in group data received from the device control supporting device(s) 135 and the device group storage 165. In some embodiments, the group merge component 152 may implement a rule that the merged group includes the device name that is included in the group of the device group storage 165. In other embodiments, the group merge component 152 may implement a rule that selects the device name that does not have spelling mistakes. In yet other embodiments, when two (or more groups) do not include the same devices, the group merge component 152 may select the device name that is available. In some cases, the GSS 145 may ask the user 105 to confirm or provide the device name.

The group merge component 152 may send (step 7), to the device group storage 165, (merged) device group data representing the merged device group. The merged device group data may include a device group identifier, a set of device identifiers corresponding to the set of smart home devices included in the merged device group, and a device group name. In some cases, the device group identifier may be the same device group identifier as the one provided by the device group storage 165 (in step 6), and the device group data corresponding to the device group identifier may be updated based on the merged device group data. For example, the smart home devices associated with the device group identifier may be updated based on a device(s) being added or removed from the original device group.

The group merge component 152 may send (step 8) the merged device group data to the outbound events component 160 for sending to the device control supporting device(s) 135 to synchronize device group data between the smart home supporting device(s) 130 and the device control supporting device(s) 135. The outbound events component 160 may send (step 9a), to the device control supporting device 135a, the merged device group data, and may send (step 9b), to the device control supporting device 135b, the merged device group data. The device control supporting device(s) 135 may store the merged device group data, and may associate a device group identifier with the merged device group data. In some cases, the device control supporting device(s) 135 may replace existing device group data, for example, the device group data communicated in step 4, or may create a new device group and delete the original device group. The outbound events component 160 may send the merged device group data using an API request.

In some embodiments, the device control supporting device(s) 135 may communicate, to the GSS 145, a device group identifier used to identify the merged device group. The GSS 145 may store the received device group identifier in the device group storage 165 as an identifier used by the device control supporting device(s) 135.

In communicating data, such as device group data and/or device identifiers, the smart home supporting device(s) 130 may use a "directed ID" that may be specific to and that may be used by the particular device control supporting device(s) 135 to identify the device group and/or device. For example, when sending the merged device group data to the device control supporting device(s) 135a, the message may include a first directed ID that the device control supporting device(s) 135a may use to identify the device group; and when sending the merged device group data to the device control supporting device(s) 135b, the message may include a second directed ID that the device control supporting device(s) 135b may use to identify the device group. In some embodiments, portions of the merged device group data may be communicated to the device control supporting device(s) 135, where the portions may correspond to a device(s) associated with/in control of the particular device control supporting device(s) 135.

In some embodiments, the device control supporting device(s) 135 may be implemented as a skill supporting device(s) 625 described below (e.g., the device control supporting device(s) 135a may be a first skill supporting device(s) 625a, the device control supporting device(s) 135b may be a second skill supporting device(s) 625b, etc.). In some embodiments, the smart home supporting device(s) 130 may communicate with a skill component 690/790, which may in turn communicate with the skill supporting device(s) 625/the device control supporting device(s) 135. The user 105 may provide permissions enabling the individual skill components to communicate with the smart home supporting device(s) 130 to control smart home devices associated with the particular skills, to enable the skills to respond to user inputs provided by the user 105 to the smart home supporting device(s) 130, and to perform other functionalities in conjunction with the smart home supporting device(s) 130 and/or the supporting device(s) 120.

In some embodiments, the device control supporting device(s) 135/the skill component 690 may request permission from the smart home supporting device(s) 130 and/or the user 105 (via a corresponding device control application) to synchronize device group data. In some embodiments, the user 105 may be notified, via the device control application 140 and the user device 110, when the device control supporting device(s) 135 requests such permissions. In some embodiments, the user 105 may provide permissions (without prompting from a system) to synchronize device group data between different device control applications. In some embodiments, the user 105 can disable synchronization of device group data without having to disable other functionalities of the device control supporting device(s) 135/the skill.

In some embodiments, the device control supporting device(s) 135/skill may use (at least) two types of permissions-one for synchronizing device groups and one for synchronizing premises. As used herein, premises refers to different environments associated with the user 105 via the same user account/profile, for example, a primary home, a vacation home, an office, etc. The device group synchronization permissions allow the device control supporting device(s) 135 to retrieve device groups that contain devices reported/supported by the device control supporting device(s) 135. The premises synchronization permissions allow the device control supporting device(s) 135 to retrieve information for all premises on a user account of the user 105, and allow retrieval of devices reported by their skill. Such permissions allow a skill developer to request access to a resource and can optionally require user approval to access the resource. The permissions also allow the user to toggle (turn on and turn off) the permissions without disabling the entire skill. For example, the user 105 could disable the synchronization permission for a particular device control skill, but still use that device control skill's smart home devices.

In some embodiments, the GSS 145 may be configured to synchronize premises group information between various device control applications. The premises group information may include information related to devices included in the premises, such as, premises name, device names, device identifiers, device location (e.g., within the premises), etc. Different device control applications may include different (or the same) premises group information, and the GSS 145 may synchronize the information in a similar manner as described herein with respect to synchronizing device group information. In synchronizing premises group information, the GSS 145 may merge data relating to premises name, device names, device locations, etc. For example, the device control supporting device(s) 135 may send first premises information associated with a first premises name "vacation" and including a first device "living room TV" located in "living room," and a second device "smart speaker" located in "kitchen". Continuing with the example, the device group storage 165 may include second premises information associated with a second premises name "vacation home" and including a first device "TV for living room" located in "living room," and a second device "speaker" located in "kitchen." The GSS 145, in this example, may determine merged premises group information associated with a premises name "vacation home" and including a first device "living room TV" located in "living room" and a second device "speaker" located in "kitchen." Such merged premises group information may be communicated to the device control supporting device(s) 135 and/or may be stored/updated in the device group storage 165. Synchronizing the premises group information may enable the user 105 to update information related to a device 110/112 in one device control application, and have the system automatically synchronize it to other device control application(s). For example, the user 105 may move a device named "speaker" from location "kitchen" to location "dining room." The change in location may be manually entered by the user 105 via the device control application 140 (or the device control application 450) or may be automatically recognized by the smart home supporting device(s) 130 (or the device control supporting device(s) 135). The change in location may communicated to the other device control application as described herein. In some embodiments, the inbound events component 155 and the outbound events component 160 may be implemented at the smart home supporting device(s) 130 separately from the GSS 145.

Figure 2:
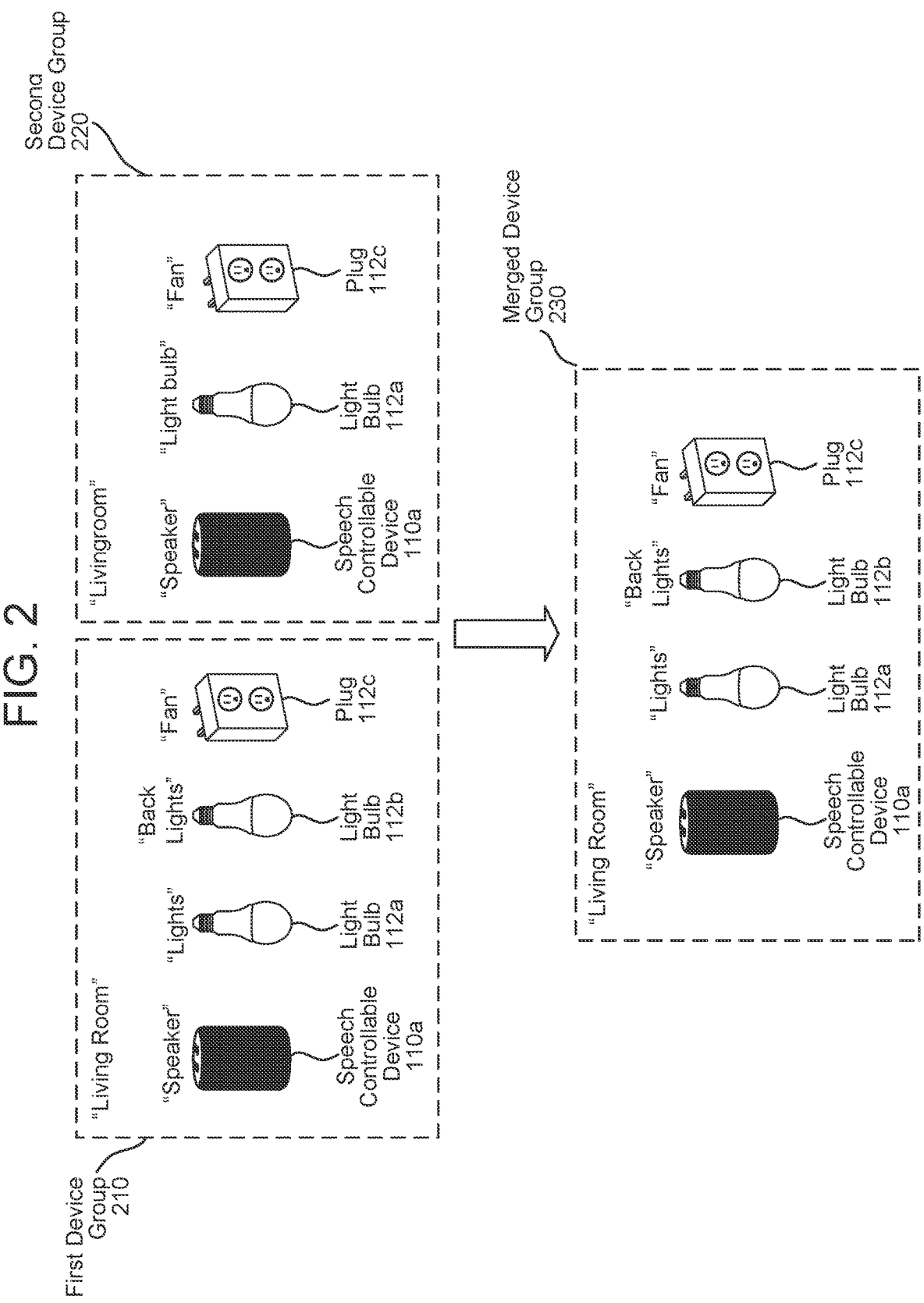
FIG. 2 is a conceptual diagram of illustrating how different device groups may be merged into a single device group, according to embodiments of the present disclosure.

FIG. 2 is a conceptual diagram of illustrating how different device groups may be merged into a single device group, according to embodiments of the present disclosure. A device group can include two or more devices (which may sometimes be referred to as "members"), such as user devices 110 and/or smart home devices 112. The devices in a device group could be controlled by different device control applications. For example, the speech controllable device 110a and the plug 112c shown in FIG. 2 may be controlled by the device control application 140/the smart home supporting device(s) 130, while the light bulbs 112a, 112b may be controlled by the device control supporting device(s) 135a. FIG. 2 shows a first device group 210 including devices 110a, 112a-112c, and the device group storage 165 may store first device group data corresponding to the first device group 210. The first device group data may include a first group identifier for the first device group 210, and may include a first device identifier associated with the device 110a, a second device identifier associated with the device 112a, a third device identifier associated with the device 112b, and a fourth device identifier associated with the device 112c. The first device group data may also include a user-provided group name (e.g., "Living Room") for the first device group 210 and user-provided device names (e.g., "Speaker", "Lights", "Back Lights", "Fan") for the individual devices 110a, 112a-112c.

FIG. 2 shows a second device group 220 including devices 110a, 112a, and 112c, and the device control supporting device(s) 135 may send second device group data corresponding to the second device group 220. The second device group data may include a second group identifier for the second device group 220, and may include a fifth device identifier associated with the device 110a, a sixth device identifier associated with the device 112a, and a seventh device identifier associated with the device 112c. The second device group data may also include a user-provided group name (e.g., "livingroom") for the second device group 220 and user-provided device names (e.g., "Speakers", "Light bulb", "Fan") for the individual devices 110a, 112a, and 112c.

As shown in FIG. 2, a merged device group 230, based on merging the first device group 210 and the second device group 220, may include the devices 110a, 112a-112c. Such merging may be performed based on the user-provided group names, such as "Living Room" and "livingroom", being similar or the same. As shown, the merged device group 230 may be named "Living Room" based on a rule that the correct spelling of a word/phrase is used for the merged group and/or a rule that the group name included in the device group storage 165 takes precedent over group names from other device control applications.

The merging of the two device groups shown in FIG. 2 may also be based on the user-provided device names being similar or the same. As shown and described herein, two device groups may be merged even though the groups have different number of devices or different types of devices. In the example shown in FIG. 2, the device 110a is the same in the two device groups 210, 220; the system may make that determination based on the user-provided device name "Speaker" and/or a mapping between the first device identifier and the fifth device identifier. The device 112a may be determined to be the same in the two device groups 210, 220 based on the device names "Lights" and "Light bulb" being similar, and the device 112c may be determined to be the same based on the device name "Fan" being the same in the two device groups 210, 220. As shown, the device names in the merged device group 230 may be "Speaker", "Lights", "Back Lights" and "Fan", which may be based on a rule that the device name included in the device group storage 165 takes precedent over device names from other device control applications.

Figure 3:
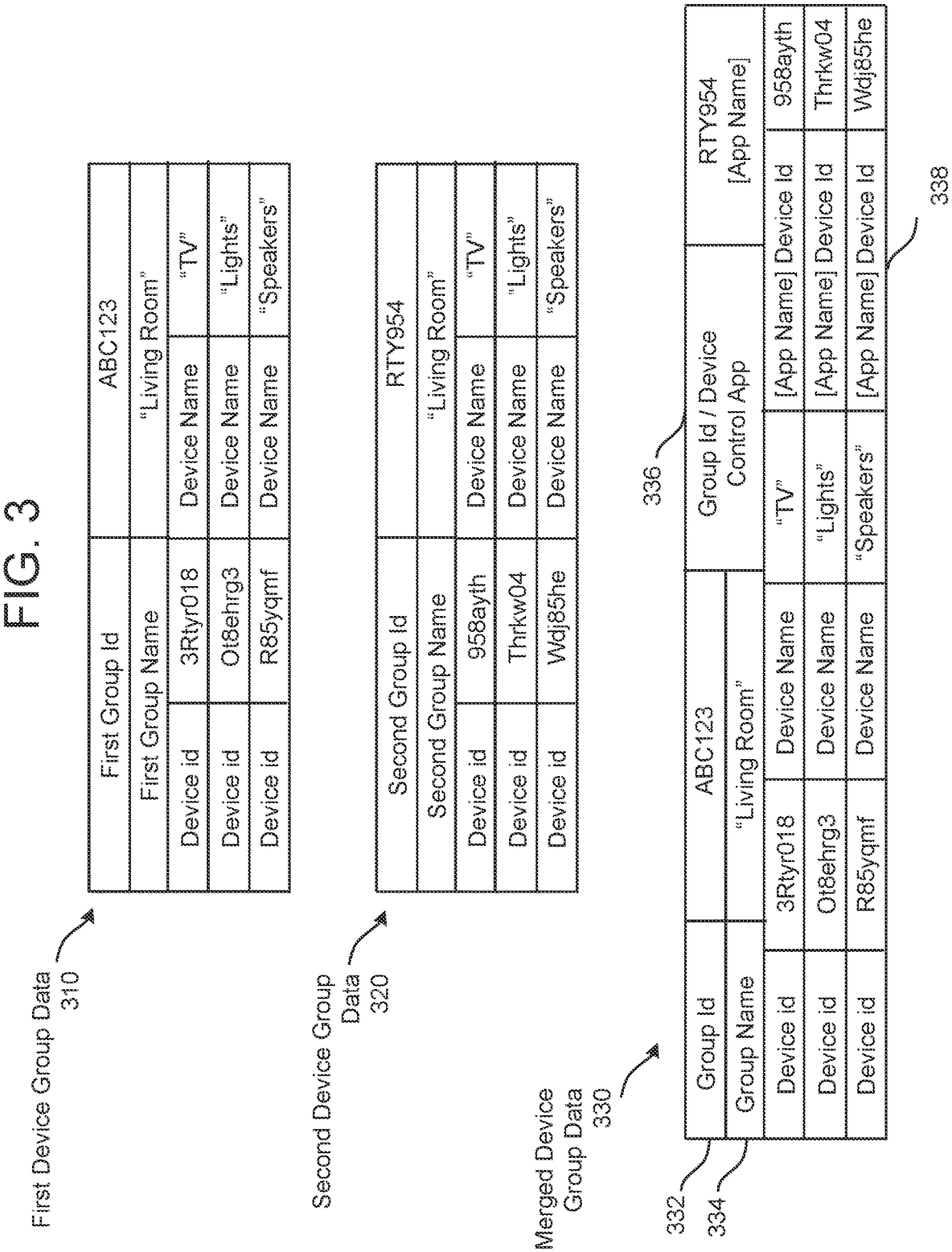
FIG. 3 shows example device group data that may be used by a system, according to embodiments of the present disclosure.

FIG. 3 shows example device group data that may be processed by the GSS 145 to determine merged group data. First device group data 310 may be provided by the device group storage 165, and second device group data 320 may be provided by the device control supporting device(s) 135a. The group merge component 152 may determine merged device group data 330 based on the first device group data 310 and the second device group data 320. The first and second device groups (corresponding to 310 and 320) may be merged based on the group name "Living Room" matching. As shown, the merged device group data 330 may include the group name (334) "Living Room." The merged device group data 330 may be stored in the device group storage 165, and may include the same group id (332) as the first device group data 310. As shown, the merged device group data 330 may also include a group id for the other device control application (336), which is the same group id included in the second device group data 320. The merged device group data 330 also includes device ids and device names from the first device group data 310, and also includes device ids 338 from the second device group data 320 corresponding to the other device control application

[App Name]. Using at least the data 336 and 338, the smart home supporting device(s) 130 can enable control of smart home devices associated with and supported by the device control supporting device(s) 135a. When a user input is received, the smart home supporting device(s) 130 may communicate such user input to the device control supporting device(s) 135a along with the group id 336 (and optionally the device ids 338), so that the device control supporting device(s) 135a can identify within its system which device group the user input relates to. The merged device group data 330 may represent a relationship, a correlation or otherwise an association between the two device groups, and as such, the merged group data 330 may include a first record including data (e.g., group id, user provided group name, device ids, user provided device names, etc.) corresponding to the smart home supporting device(s) 130 and a second record including data (e.g., group id, user provided group name, device ids, user provided device names, etc.) corresponding to the device control supporting device(s) 135a.

Merged device group data, such as data 330, may include merged group data correlating device groups and devices across any number of different device control applications. In some embodiments, the merged device group data may also include the user-provided group names and user-provided device names, which may differ for individual device control applications.

Figure 4:
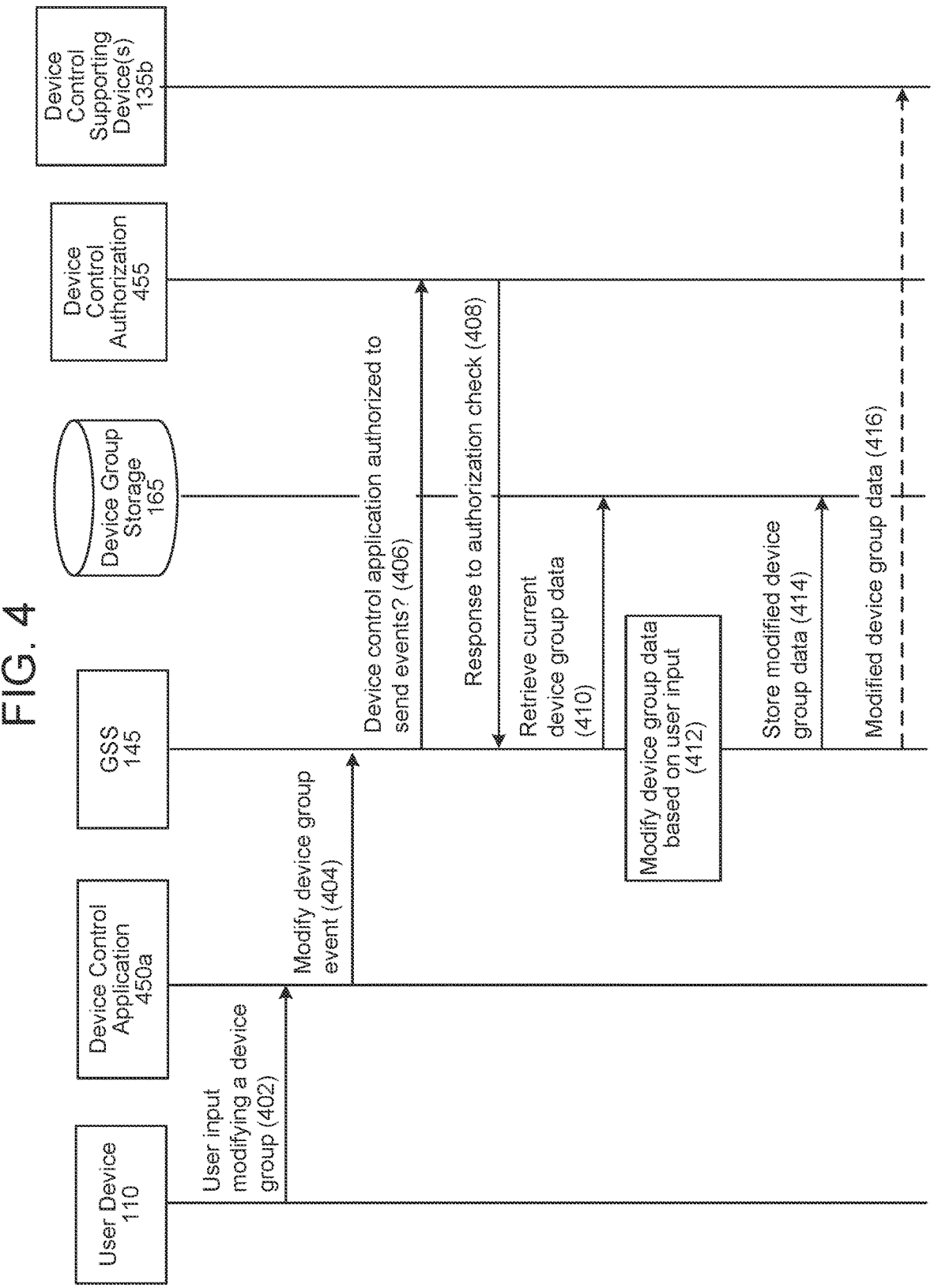
FIG. 4 is a signal flow diagram illustrating a process for modifying device group data based on a user input received at a device control application, according to embodiments of the present disclosure.

FIG. 4 is a signal flow diagram illustrating a process for modifying device group data based on a user input received at a device control application 450 of the device control supporting device(s) 135, according to embodiments of the present disclosure. An application corresponding to the device control application 450a may be installed on the user device 110, and may provide a user interface for the user 105 to provide various inputs, such as authorization for synchronizing device groups, adding or removing devices, modifying settings for devices, etc. In some embodiments, some of the functionalities described as being performed by the device control application 450 may be performed by the corresponding application on the user device 110. The user device 110 may include a first application corresponding to the smart home device supporting device(s) 130/the device control application 140 that enables the user 105 to control first devices 110, 112 (e.g., Amazon Alexa compatible devices). The user device 110 may further include a second separate application corresponding to the device control supporting device(s) 135/the device control application 450 that enables the user 105 to control second devices 110, 112 (e.g., Philips Hue compatible devices).

The device control application 450a may be implemented at the device control supporting device(s) 135a, and a device control application 450b may be implemented at the device control supporting device(s) 135b. Referring to FIG. 4, the user device 110 may receive a user input modifying a device group, and the user device 110 may send the user input to the device control application 450a (402), which may correspond to software operating with respect to the user device 110. The user input may be received after the smart home supporting device(s) 130 have synchronized device group data with at least the device control supporting device(s) 135a as described above in relation to FIG. 1. Such user input may modify the device group by adding a device to an existing device group, by removing a device from an existing device group, by modifying a group name of an existing device group, by modifying a device name for a device in an existing device group, or by creating a new device group. In some cases, the user input may modify the device group by modifying a setting related to or an operation of a device in an existing device group. For example, the user 105 may change a dim level of lights or may change a time when a TV is to turn off.

The device control application 450a may send a modify device group event (404) to the GSS 145 (via the inbound events component 155 for example), where the event may include a device group identifier used by the device control application 450a to identify the device group the user input modifies. The event may also include the user input or an indication of the modification made (e.g., update group name, add/remove device, update device operation, etc.). The event may be sent as an API request.

The GSS 145 may a send, to a device control authorization component 455, a request to determine whether the device control application 450a is authorized to send events (406), in particular, for example, device group modification events. As described herein, the device control supporting device(s) 135a may request and receive permissions from the user 105 to allow for device group synchronizations with the smart home supporting device(s) 130. The device control authorization component 455 may be included in the smart home supporting device(s) 130, the supporting device(s) 120, and/or the user device 110. The device control authorization component 455 may determine whether the device control application 450a has the appropriate permissions by using data stored in the profile storage 670/770 or another data storage. The device control authorization component 455 may send, to the GSS component 145, a response to the authorization check (408), which may indicate whether the device control application 450a has the appropriate permissions or not (e.g., may be a Boolean value (True or False; 1 or 0; yes or no; etc.).

Assuming, in this example, that the device control application 450a has the appropriate permissions, the GSS 145 may retrieve, from the device group storage 165, current device group data (410). The GSS 145 may use the device group identifier included in the modify event (404) to identify the current device group data. As described in relation to FIG. 3, the device group storage 165 may include a device group identifier used by other device control applications, so that the device group identifier in a modify event from the device control application 450a can be used to identify the corresponding device group data in the device group storage 165.

The GSS 145 may modify the retrieved device group data based on the user input (412). The GSS 145 may store, in the device group storage 165, the modified device group data (414). The modified device group data may be associated with the same/existing device group identifier. The modified device group data may reflect the modifications made by the user input, for example, addition/removal of a device. In case the user input creates a new device group, then the modified device group data may be associated with a new device group identifier, and may also include the device group identifier provided by the device control application 450a.

In some embodiments, the GSS 145 may send the modified device group data to the device control supporting device(s) 135a. In other embodiments, the modified device group data may not be communicated to the device control supporting device(s) 135a as the request to modify the device group data originated from its device control application 450a (the event in step 404). In such embodiments, the GSS 145 may send a message (response to the event) to the device control supporting device(s) 135 that the request to modify group data has been completed.

In some cases, the GSS 145 may send the modified device group data to the device control supporting device(s) 135*b* (416). The GSS 145 may do so when the modified device group includes a smart home device(s) 112 that is controlled using the device control supporting device(s) 135*b*, whether or not that smart home device(s) is modified by the user input. In the case of a new group creation, the GSS 145 may send the new device group data when it includes a smart home device(s) controlled by the device control supporting device(s) 135*b*.

The device control authorization component 455, in some embodiments, may be configured to manage and check permissions for operations that device control applications can perform with respect to a user profile. In one example, the device control authorization component 455 may allow device control supporting device(s) 135 to request permission from the user 105 to synchronize user's device group data. In another example, the device control authorization component 455 may allow the device control supporting device(s) 135 to only view and edit device groups that contain smart home devices controlled by the device control supporting device(s) 135. In yet another example, the device control authorization component 455 may allow the device control supporting device(s) 135 to only view and edit device locations for smart home devices controlled by the device control supporting device(s) 135.

Figure 5:
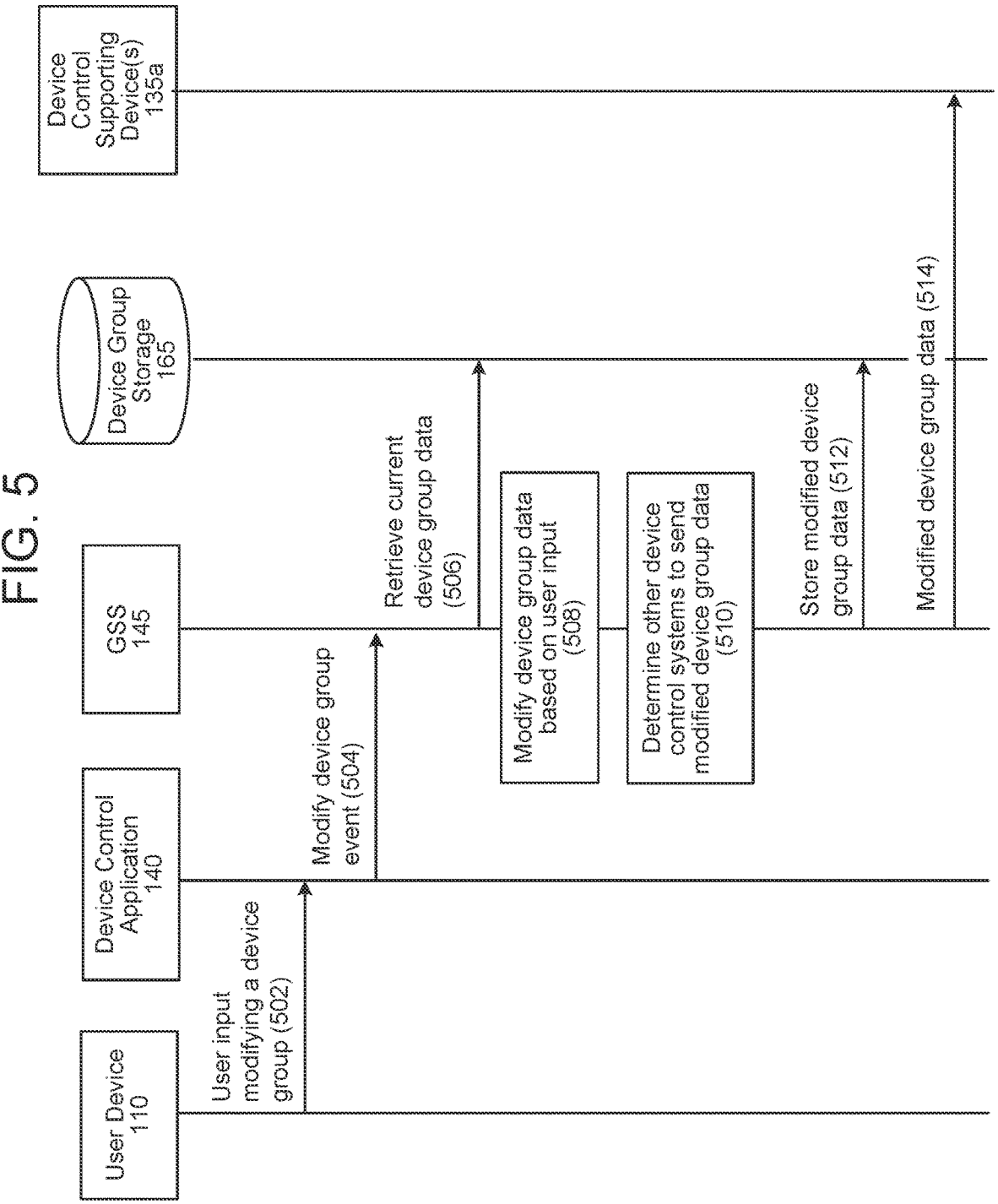
FIG. 5 is a signal flow diagram illustrating a process for modifying device group data based on a user input received at another device control application, according to embodiments of the present disclosure.

FIG. 5 is a signal flow diagram illustrating a process for modifying device group data based on a user input received at the device control application 140 of the smart home supporting device(s) 130, according to embodiments of the present disclosure. Similar to as described above in relation to FIG. 4, the user device 110 may receive a user input modifying a device group. In this example, the user input may be received via the device control application 140 (502).

The device control application 140 may send a modify device group event to the GSS 145 (504), and the event may include a device group identifier associated with the device group being modified by the user input. The device group identifier may be used by the smart home supporting device(s) 130 to identify the corresponding device group. The GSS 145 may retrieve current device group data from the device group storage 165 (506). The GSS 145 may retrieve the current device group data associated with the device group identifier included in the event.

The GSS 145 may modify the device group data based on the user input (508) (e.g., update group name, add/remove devices, etc.). The GSS 145 may determine other device control systems to send the modified device group data (510), where such determination may be based on a smart home device(s), included in the modified device group data, being controlled by the other device control system. In this example, assuming the modified device group data includes a device 110, 112 that is controlled by the device control supporting device(s) 135*a*. The GSS 145 may store the modified device group data in the device group storage 165 (512), and the GSS 145 may send the modified device group data to the device control supporting device(s) 135*a* (514).

Referring to FIGS. 4 and 5, in some embodiments, when the modified device group data is sent, the GSS 145 may also request the device control supporting device(s) 135 to send updated data for the modified device group. For example, in case a device 110, 112 is added to an existing group, the GSS 145 may request a device identifier used by the device control supporting device(s) 135 to identify the added device 110, 112. As another example, in a case a new device group is created, the GSS 145 may request a device group identifier used by the device control supporting device(s) 135 to identify the new device group. The data provided by the device control supporting device(s) 135 may be stored in the modified device group data in the device group storage 165.

In some embodiments, communications from the GSS 145 to the device control supporting device(s) 135*a* may be sent via the outbound events component 160, and communications to the GSS 145 may be received via the inbound events component 155.

In some embodiments, the smart home supporting device(s) 130 is configured to send portions of device group data associated with the particular device control supporting device(s) 135 to the respective device control supporting device(s) 135. This may be done to limit exposure of data of a device control system to other device control systems. For example, a merged device group may include a first device controllable by the smart home supporting device(s) 130, a second device controllable by the device control supporting device(s) 135*a*, and a third device controllable by the device control supporting device(s) 135*b*. In communicating merged device group data (e.g., steps 9*a*, 9*b* of FIG. 1, step 416 of FIG. 4, step 514 of FIG. 5, etc.), the smart home supporting device(s) 130 may send, to the device control supporting device(s) 135*a*, a first portion of the merged device group data including a group name, a group identifier, a device name and device identifier for the second device, based on the second device being controllable by the device control supporting device(s) 135*a*. Continuing with the example, the smart home supporting device(s) 130 may send, to the device control supporting device(s) 135*b*, a second portion of the merged device group data including a group name, a group identifier, a device name and device identifier for the third device, based on the third device being controllable by the device control supporting device(s) 135*b*.

Figure 6:
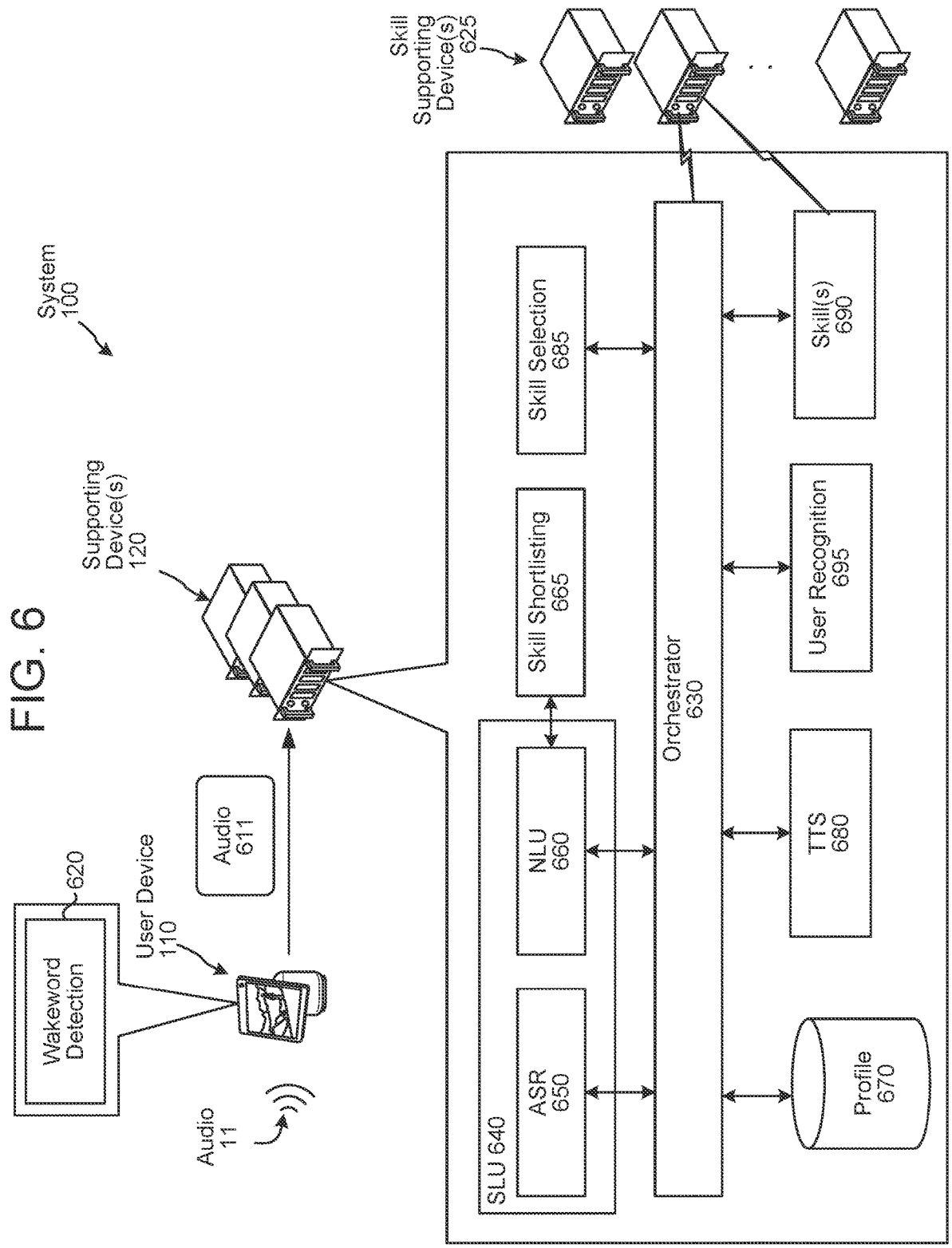
FIG. 6 is a conceptual diagram illustrating example system components that may be used to process a user input, according to embodiments of the present disclosure.

Referring now to FIG. 6, the following describes example components, of a supporting device(s) 120 that may be used to process a user input. The user 105 may speak an input, and the user device 110 may receive audio 11 representing the spoken user input. For example, the user 105 may say "Alexa, what is the weather" or "Alexa, book me a plane ticket to Seattle." In other examples, the user 105 may provide another type of input (e.g., selection of a button, selection of one or more displayed graphical interface elements, perform a gesture, etc.). The user device 110 may send input data to the supporting device(s) 120 for processing. In examples where the user input is a spoken user input, the input data may be audio data 611. In other examples, the input data may be text data, or image data.

In the example of a spoken user input, a microphone or array of microphones (of or otherwise associated with the user device 110) may continuously capture the audio 11, and the user device 110 may continually process audio data, representing the audio 11, as it is continuously captured, to determine whether speech is detected. The user device 110 may use various techniques to determine whether audio data includes speech. In some examples, the user device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 11, the user device 110 may determine if the speech is directed at the user device 110. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the user device 110 may "wake" and send, to the supporting device(s) 120, the input audio data 611 representing the spoken user input.

The supporting device(s) 120 may include an orchestrator component 630 configured to, among other things, coordinate data transmissions between components of the supporting device(s) 120. The orchestrator component 630 may receive the audio data 611 from the user device 110, and send the audio data 611 to an ASR component 650.

The ASR component 650 transcribes the audio data 611 into ASR output data including one or more ASR hypotheses. An ASR hypothesis may be configured as a textual interpretation of the speech in the audio data 611, or may be configured in another manner, such as one or more tokens. Each ASR hypothesis may represent a different likely interpretation of the speech in the audio data 611. Each ASR hypothesis may be associated with a score (e.g., confidence score, probability score, or the like) representing the associated ASR hypothesis correctly represents the speech in the audio data 611.

The ASR component 650 interprets the speech in the audio data 611 based on a similarity between the audio data 611 and pre-established language models. For example, the ASR component 650 may compare the audio data 611 with models for sounds (e.g., subword units, such as phonemes, etc.) and sequences of sounds to identify words that match the sequence of sounds of the speech represented in the audio data 611.

In at least some instances, instead of the user device 110 receiving a spoken natural language input, the user device 110 may receive a textual (e.g., typed) natural language input. The user device 110 may determine text data representing the textual natural language input, and may send the text data to the supporting device(s) 120, wherein the text data is received by the orchestrator component 630. The orchestrator component 630 may send the text data or ASR output data, depending on the type of natural language input received, to a NLU component 660.

The NLU component 660 processes the ASR output data or text data to determine one or more NLU hypotheses embodied in NLU output data. The NLU component 660 may perform intent classification (IC) processing on the ASR output data or text data to determine an intent of the natural language input. An intent corresponds to an action to be performed that is responsive to the natural language input. To perform IC processing, the NLU component 660 may communicate with a database of words linked to intents. For example, a music intent database may link words and phrases such as "quiet," "volume off," and "mute" to a <Mute> intent. The NLU component 660 identifies intents by comparing words and phrases in ASR output data or text data to the words and phrases in an intents database. In some embodiments, the NLU component 660 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 660 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 660 may be linked to one or more grammar frameworks with entity types to be populated with entity values. Each entity type of a grammar framework corresponds to a portion of ASR output data or text data that the NLU component 660 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 660 may perform NER processing to identify words in ASR output data or text data as subject, object, verb, preposition, etc. based on grammar rules and/or models. Then, the NLU component 660 may perform IC processing using the identified verb to identify an intent. Thereafter, the NLU component 660 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 660 may generate NLU output data including one or more NLU hypotheses, with each NLU hypothesis including an intent and optionally one or more entity types and corresponding entity values. In some embodiments, the NLU component 660 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

The skill shortlisting component 665 is configured to determine a subset of skill components, implemented by or in communication with the supporting device(s) 120, that may perform an action responsive to the (spoken) user input. Without the skill shortlisting component 665, the NLU component 660 may process ASR output data input thereto with respect to every skill component of or in communication with the supporting device(s) 120. By implementing the skill shortlisting component 665, the NLU component 660 may process ASR output data with respect to only the skill components the skill shortlisting component 665 determines are likely to execute with respect to the user input. This reduces total compute power and latency attributed to NLU processing.

The skill shortlisting component 665 may include one or more ML models. The ML model(s) may be trained to recognize various forms of user inputs that may be received by the supporting device(s) 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The supporting device(s) 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 665, may be trained with respect to a different skill component. Alternatively, the skill shortlisting component 665 may implement one ML model per domain, such as one ML model for skill components associated with a weather domain, one ML model for skill components associated with a ride sharing domain, etc.

The sample user inputs provided by a skill component developer, and potentially related sample user inputs determined by the supporting device(s) 120, may be used as binary examples to train a ML model associated with a skill component. For example, some sample user inputs may be positive examples (e.g., user inputs that may be used to invoke the skill component). Other sample user inputs may be negative examples (e.g., user inputs that may not be used to invoke the skill component).

As described above, the skill shortlisting component 665 may include a different ML model for each skill component, a different ML model for each domain, or some other combination of ML models. In some embodiments, the skill shortlisting component 665 may alternatively include a single ML model. This ML model may include a portion trained with respect to characteristics (e.g., semantic characteristics) shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 665 may make binary (e.g., yes or no) determinations regarding which skill components relate to the ASR output data. The skill shortlisting component 665 may make such determinations using the one or more ML models described herein above. If the skill shortlisting component 665 implements a different ML model for each skill component, the skill shortlisting component 665 may run the ML models that are associated with enabled skill components as indicated in a user profile associated with the user device 110 and/or the user 105.

The skill shortlisting component 665 may generate an n-best list of skill components that may execute with respect to the user input represented in the ASR output data. The size of the n-best list of skill components is configurable. In an example, the n-best list of skill components may indicate every skill component of, or in communication with, the supporting device(s) 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 665 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 665 may output a different n-best list of skill components for each ASR hypothesis. Alternatively, the skill shortlisting component 665 may output a single n-best list of skill components representing the skill components that are related to the multiple ASR hypotheses represented in the ASR output data.

As indicated above, the skill shortlisting component 665 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component 650. Additionally or alternatively, the n-best list of skill components may include no more than a threshold number of entries for each ASR hypothesis (e.g., no more than five entries for a first ASR hypothesis, no more than five entries for a second ASR hypothesis, etc.).

Additionally or alternatively to making a binary determination regarding whether a skill component potentially relates to the ASR output data, the skill shortlisting component 665 may generate confidence scores representing likelihoods that skill components relate to the ASR output data. The skill shortlisting component 665 may perform matrix vector modification to obtain confidence scores for all skill components in a single instance of processing of the ASR output data.

An n-best list of skill components including confidence scores that may be output by the skill shortlisting component 665 may be represented as, for example:

Story skill component, 0.67
Recipe skill component, 0.62
Information skill component, 0.57
Shopping skill component, 0.62

As indicated, the confidence scores output by the skill shortlisting component 665 may be numeric values. The confidence scores output by the skill shortlisting component 665 may alternatively be binned values (e.g., high, medium, low).

The n-best list of skill components may only include entries for skill components having a confidence score satisfying (e.g., meeting or exceeding) a minimum threshold confidence score. Alternatively, the skill shortlisting component 665 may include entries for all skill components associated with enabled skill components of the current user, even if one or more of the skill components are associated with confidence scores that do not satisfy the minimum threshold confidence score.

The skill shortlisting component 665 may consider other data when determining which skill components may relate to the user input represented in the ASR output data as well as respective confidence scores. The other data may include usage history data, data indicating the skill components that are enabled with respect to the user device 110 and/or user 105, data indicating a device type of the user device 110, data indicating a speed of the user device 110, a location of the user device 110, data indicating a skill component that was being used to output content via the user device 110 when the user device 110 received the instant user input, etc.

The thresholding implemented with respect to the n-best list of skill components generated by the skill shortlisting component 665 as well as the different types of other data considered by the skill shortlisting component 665 are configurable.

As described above, the supporting device(s) 120 may perform speech processing using two different components (e.g., the ASR component 650 and the NLU component 660). In at least some embodiments, the supporting device(s) 120 may implement a spoken language understanding (SLU) component 660 configured to process audio data 611 to determine NLU output data.

The SLU component 640 may be equivalent to a combination of the ASR component 650 and the NLU component 660. Yet, the SLU component 640 may process audio data 611 and directly determine the NLU output data, without an intermediate step of generating ASR output data. As such, the SLU component 640 may take audio data 611 representing a spoken natural language input and attempt to make a semantic interpretation of the spoken natural language input. That is, the SLU component 640 may determine a meaning associated with the spoken natural language input and then implement that meaning. For example, the SLU component 640 may interpret audio data 611 representing a spoken natural language input in order to derive a desired action. The SLU component 640 may output a most likely NLU hypothesis, or multiple NLU hypotheses associated with respective confidence or other scores (such as probability scores, etc.).

The supporting device(s) 120 may include a gesture detection component (not illustrated in FIG. 6). The supporting device(s) 120 may receive image data representing a gesture, and the gesture detection component may process the image data to determine a gesture represented therein. The gesture detection component may implement art-/industry-known gesture detection processes.

In embodiments where the supporting device(s) 120 receives non-image data (e.g., text data) representing a gesture, the orchestrator component 630 may be configured to determine what downstream processing is to be performed in response to the gesture.

The system may include a skill selection component 685 is configured to determine a skill component, or n-best list of skill components each associated with a confidence score/value, to execute to respond to the user input. The skill selection component 685 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the user device 110 to output content (e.g., music, video, synthesized speech, etc.) when the user device 110 captured the user input, one or more skill components that are indicated as enabled in a profile (as stored in the profile storage 670) associated with the user 105, output capabilities of the user device 110, a geographic location of the user device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule (e.g., each rule corresponding to a different intent capable of being handled by the skill component). In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components (e.g., only skill components indicated as enabled in the user profile of the user 105).

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of responding to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 685. For example, such other data may indicate capabilities (e.g., output capabilities or components such as a connected screen, loudspeaker, etc.) of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator (e.g., flag, representing a strength of the skill component's ability to personalize its response to the user input).

In some embodiments, a skill component's pre-response may be configured to a pre-defined schema. By requiring pre-responses to conform to a specific schema (e.g., by requiring skill components to only be able to provide certain types of data in pre-responses), new skill components may be onboarded into the skill component selection functionality without needing to reconfigure the skill selection component 685 each time a new skill component is onboarded. Moreover, requiring pre-responses to conform to a schema limits the amount of values needed to be used to train and implement a ML model for ranking skill components.

In some embodiments, a skill component's pre-response may indicate whether the skill component requests exclusive display access (i.e., whether the skill component requests its visual data be presented on an entirety of the display).

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105 (e.g., as represented in a user profile or group profile stored in the profile storage 670), NLU confidence scores of the NLU output data, a device type of the user device 110, data indicating whether the user device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition (e.g., a threshold NLU confidence score) that the skill component was outputting content via the user device 110 when the user device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition (e.g., a threshold NLU confidence score, etc.).

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The supporting device(s) 120 may include or otherwise communicate with one or more skill components 690. A skill component 690 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the user device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill supporting device(s) 625 may communicate with the skill component(s) 690 within the supporting device(s) 120 directly and/or via the orchestrator component 630. A skill supporting device(s) 625 may be configured to perform one or more actions. A skill component 690 may enable a skill supporting device(s) 625 to execute specific functionality in order to provide data or perform some other action requested by a user. For example, a weather service skill may enable a skill supporting device(s) 625 to provide weather information to the supporting device(s) 120, a car service skill may enable a skill supporting device(s) 625 to book a trip using a taxi or ride sharing service, an order pizza skill may enable a skill supporting device(s) 625 to order a pizza using a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The supporting device(s) 120 may include a skill component 690 dedicated to interacting with the skill supporting device(s) 625. A skill, skill device, or skill component may include a skill component 690 operated by the supporting device(s) 120 and/or operated by the skill supporting device(s) 625.

A skill component may operate in conjunction between the user device 110, the supporting device(s) 120 and/or other devices, such as a restaurant electronic ordering system, a taxi electronic booking system, etc. in order to complete certain functions. Inputs to a skill component 690 may come from speech processing interactions or through other interactions or input sources.

A skill component 690/skill supporting device(s) 625 may be associated with a domain, a non-limiting list of which includes a smart home domain, a music domain, a video domain, a weather domain, a communications domain, a flash briefing domain, a shopping domain, and a custom domain.

The skill component 690 may process to determine output data responsive to the spoken user input (e.g., based on the intent and entity data as represented in the NLU output data received by the skill component 690).

The supporting device(s) 120 may include a TTS component 680 that generates audio data including synthesized speech. The TTS component 680 is configured to generate output audio data including synthesized speech. The TTS component 680 may perform speech synthesis using one or more different methods. In one method of synthesis called unit selection, the TTS component 680 matches a database of recorded speech against the data input to the TTS component 680. The TTS component 680 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 680 may match units to the input data to create a natural sounding waveform. The unit database may include multiple examples of phonetic units to provide the TTS component 680 with many different options for concatenating units into speech. One benefit of unit selection is that, depending on the size of the database, a natural sounding speech output may be generated. The larger the unit database, the more likely the TTS component 680 will be able to construct natural sounding speech.

Unit selection speech synthesis may be performed as follows. Unit selection includes a two-step process. First the TTS component 680 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the TTS component 680. As part of unit selection, the TTS component 680 chooses the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 680 to create an artificial speech waveform output. Parametric synthesis may use an acoustic model and various statistical techniques to match data, input to the TTS component 680, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 680 may include an acoustic model, or other models, which may convert data, input to the TTS component 680, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 680 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (i.e., a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 680, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 680 may also calculate potential states for other potential audio outputs, such as various ways of pronouncing phoneme /E/, as potential acoustic matches for the phonetic unit. In this manner multiple states and state transition probabilities may be calculated.

The probable states and probable state transitions calculated by the TTS component 680 may lead to a number of potential audio output sequences. Based on the acoustic model and other potential models, the potential audio output sequences may be scored according to a confidence level of the TTS component 680. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The supporting device(s) 120 may include a user recognition component 695. The user recognition component 695 may recognize one or more users using various data. The user recognition component 695 may take as input the audio data 611. The user recognition component 695 may perform user recognition by comparing speech characteristics, in the audio data 611, to stored speech characteristics of users. The user recognition component 695 may additionally or alternatively perform user recognition by comparing biometric data (e.g., fingerprint data, iris data, retina data, etc.), received by the supporting device(s) 120 in correlation with a natural language input, to stored biometric data of users. The user recognition component 695 may additionally or alternatively perform user recognition by comparing image data (e.g., including a representation of at least a feature of a user), received by the supporting device(s) 120 in correlation with a natural language input, with stored image data including representations of features of different users. The user recognition component 695 may perform other or additional user recognition processes, including those known in the art. For a particular natural language input, the user recognition component 695 may perform processing with respect to stored data of users associated with the user device 110 that received the natural language input.

The user recognition component 695 determines whether a natural language input originated from a particular user. For example, the user recognition component 695 may determine a first value representing a likelihood that a natural language input originated from a first user, a second value representing a likelihood that the natural language input originated from a second user, etc. The user recognition component 695 may also determine an overall confidence regarding the accuracy of user recognition processing.

The user recognition component 695 may output a single user identifier corresponding to the most likely user that originated the natural language input. Alternatively, the user recognition component 695 may output multiple user identifiers (e.g., in the form of an N-best list) with respective values representing likelihoods of respective users originating the natural language input. The output of the user recognition component 695 may be used to inform NLU processing, processing performed by a skill component 690, as well as processing performed by other components of the supporting device(s) 120 and/or other systems.

The supporting device(s) 120 may include profile storage 670. The profile storage 670 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 670 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 670 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 7:
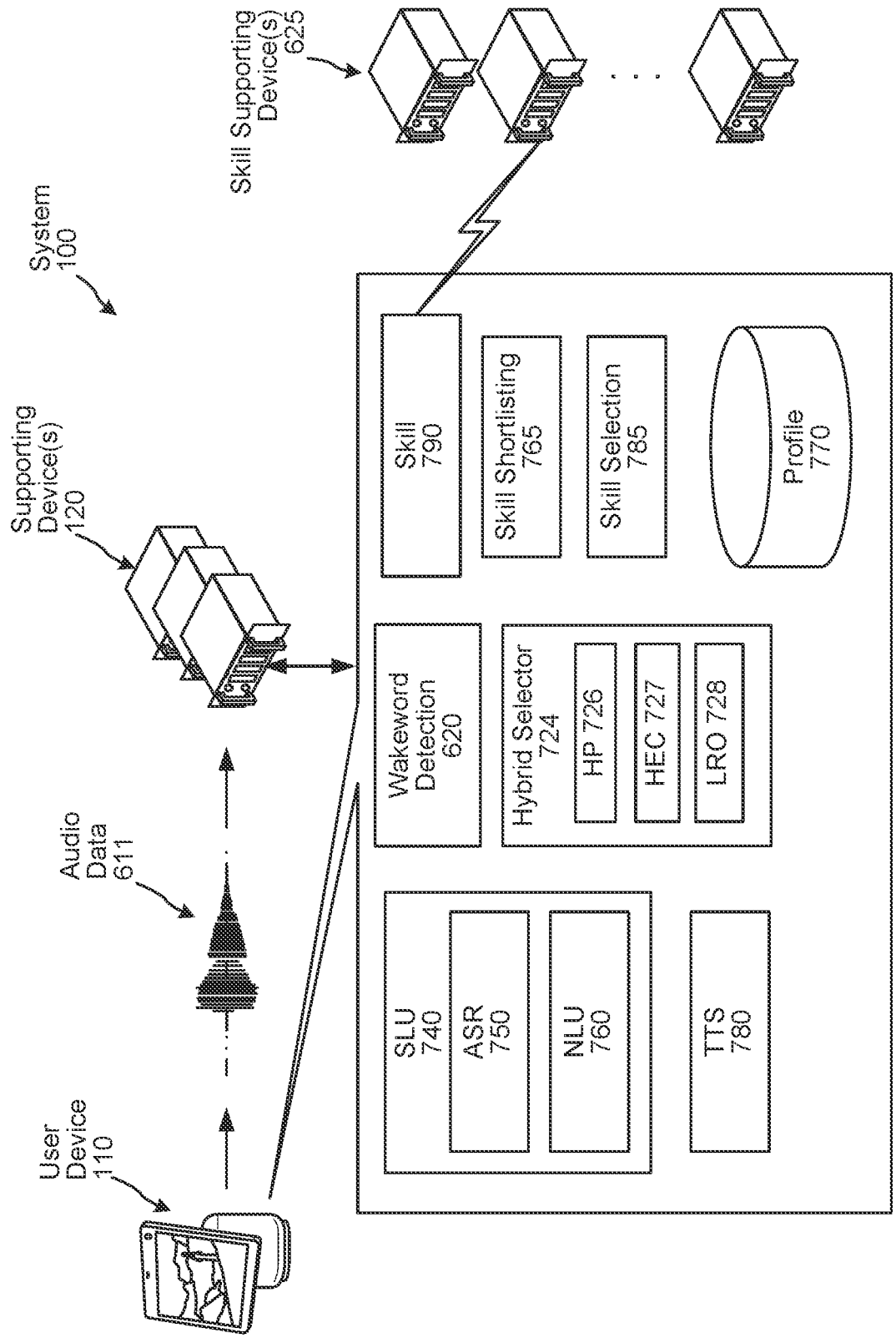
FIG. 7 is a conceptual diagram of components of a device, according to embodiments of the present disclosure.

The foregoing describes illustrative components and processing of the supporting device(s) 120. The following describes illustrative components and processing of the user device 110. As illustrated in FIG. 7, in at least some embodiments the supporting device(s) 120 may receive the audio data 611 from the user device 110, to recognize speech in the received audio data 611, and to perform functions in response to the recognized speech. In at least some embodiments, these functions involve sending directives (e.g., commands), from the supporting device(s) 120 to the user device 110 to cause the user device 110 to perform an action, such as output synthesized speech (responsive to the spoken user input) via a loudspeaker(s), and/or control one or more secondary devices by sending control commands to the one or more secondary devices.

Thus, when the user device 110 is able to communicate with the supporting device(s) 120 over the network(s) 199, some or all of the functions capable of being performed by the supporting device(s) 120 may be performed by sending one or more directives over the network(s) 199 to the user device 110, which, in turn, may process the directive(s) and perform one or more corresponding actions. For example, the supporting device(s) 120, using a remote directive that is included in response data (e.g., a remote response), may instruct the user device 110 to output synthesized speech via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It will be appreciated that the supporting device(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted previously, the user device 110 may include a wakeword detection component 620 configured to detect a wakeword (e.g., "Alexa") that indicates to the user device 110 that the audio data 611 is to be processed for determining NLU output data. In at least some embodiments, a hybrid selector 724, of the user device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the supporting device(s) 120 and/or an ASR component 750 implemented by the device 110. The wakeword detection component 620 may also send an indication, to the hybrid selector 724, representing a wakeword was not detected. In response to receiving such an indication, the hybrid selector 724 may refrain from sending the audio data 611 to the supporting device(s) 120, and may prevent the ASR component 750 from processing the audio data 611. In this situation, the audio data 611 can be discarded.

The user device 110 may conduct its own speech processing using on-device language processing components (such as a SLU component 740, the ASR component 750, and/or a NLU component 760) similar to the manner discussed above with respect to the system-implemented SLU component 640, ASR component 650, and NLU component 660. The user device 110 may also internally include, or otherwise have access to, other components such as one or more skill components 790 (configured to process in a similar manner to the one or more skills components 690 implemented by and/or in communication with the supporting device(s) 120/the skill supporting device(s) 625), a profile storage 770 (configured to store similar profile data to the profile storage 670 implemented by the supporting device(s) 120), a TTS component 780 (configured to process in a similar manner to the TTS component 680 implemented by the supporting device(s) 120), a skill selection component 785 (configured to process in a similar manner to the skill selection component 685 implemented by the supporting device(s) 120), a skill shortlisting component 765 (configured to process in a similar manner to the skill shortlisting component 665 implemented by the supporting device(s) 120), and/or other components. In at least some embodiments, the profile storage 770 may only store profile data for a user or group of users specifically associated with the user device 110.

In at least some embodiments, the on-device language processing components may not have the same capabilities as the language processing components implemented by the supporting device(s) 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the supporting device(s) 120. If the user device 110 attempts to process a user input for which the on-device language processing components are not necessarily best suited, the NLU output data, determined by the on-device components, may have a low confidence or other metric indicating that the processing by the on-device language processing components may not be as accurate as the processing done by the supporting device(s) 120.

The hybrid selector 724, of the user device 110, may include a hybrid proxy (HP) 726 configured to proxy traffic to/from the supporting device(s) 120. For example, the HP 726 may be configured to send messages to/from a hybrid execution controller (HEC) 727 of the hybrid selector 724. For example, command/directive data received from the supporting device(s) 120 can be sent to the HEC 727 using the HP 726. The HP 726 may also be configured to allow the audio data 611 to pass to the supporting device(s) 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of the audio data 611, and to otherwise initiate the operations of on-device language processing when the audio data 611 becomes available. In general, the hybrid selector 724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the supporting device(s) 120 and chooses to use that remotely-determined directive data.

Thus, when the audio data 611 is received, the HP 726 may allow the audio data 611 to pass through to the supporting device(s) 120 and the HP 726 may also input the audio data 611 to the ASR component 750 by routing the audio data 611 through the HEC 727 of the hybrid selector 724, whereby the LRO 728 notifies the ASR component 750 of the audio data 611. At this point, the hybrid selector 724 may wait for response data from either or both the supporting device(s) 120 and/or the on-device language processing components. However, the disclosure is not limited thereto, and in some examples the hybrid selector 724 may send the audio data 611 only to the ASR component 750 without departing from the disclosure. For example, the user device 110 may process the audio data 611 on-device without sending the audio data 611 to the supporting device(s) 120.

The ASR component 750 is configured to receive the audio data 611 from the hybrid selector 724, and to recognize speech in the audio data 611, and the NLU component 760 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 760) may be selected as usable to respond to a user input, and local response data may be sent to the hybrid selector 724, such as a "ReadyToExecute" response. The hybrid selector 724 may then determine whether to use directive data from the on-device components to respond to the user input, to use directive data received from the supporting device(s) 120, assuming a remote response is even received (e.g., when the user device 110 is able to access the supporting device(s) 120 over the network(s) 199), or to determine output data requesting additional information from the user 105.

The user device 110 and/or the supporting device(s) 120 may associate a unique identifier with each user input. The user device 110 may include the unique identifier when sending the audio data 611 to the supporting device(s) 120, and the response data from the supporting device(s) 120 may include the unique identifier to identify to which user input the response data corresponds.

In at least some embodiments, the user device 110 may include one or more skills 790 that may process similarly to the system-implemented skill(s) 690. The skill(s) 790 installed on (or in communication with) the user device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 8:
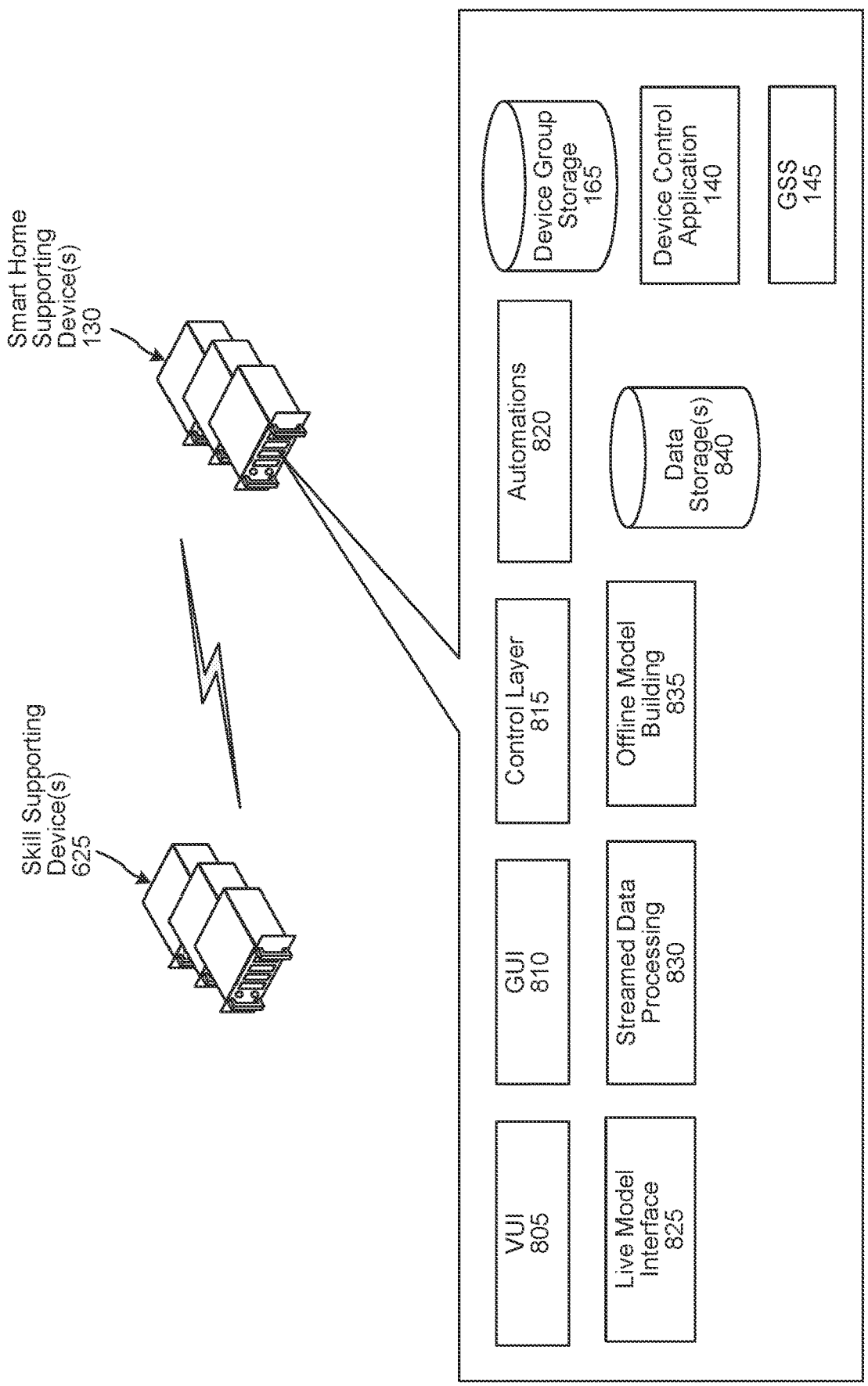
FIG. 8 is a block diagram conceptually illustrating example components of a smart home system, according to embodiments of the present disclosure.

FIG. 8 is a conceptual diagram of components of the smart home supporting device(s) 130 in addition to those described above. The smart home supporting device(s) 130 may include a voice user interface (VUI) component 805, a graphical user interface (GUI) component 810, a control layer 815, an automations component 820, a live model interface 825, a streamed data processing component 830, an offline model building component 835, and one or more data storages 840.

The VUI component 805 may include a smart home skill configured to process with respect to NLU output data corresponding to a home automation domain. The VUI component 805 may further include a component configured to handle ambiguous target resolution for home automation domain comments. This component may generate one or more questions for resolving an ambiguous entity reference in a spoken user input. For example, for the spoken user input "turn on couch", this component may generate the question "did you mean the sofa light?" The VUI component 805 may include a recovery arbitration and friction feedback learning engine configured to arbitrate between misrouted smart home domain intents and, for example, music domain intents. The VUI component 805 may include a skill configured to handle group management (e.g., create/update membership/delate) and device rename intents. This skill may also attempt to recover user friction device turn on/off intents.

The GUI component 810 may include one or more front end services configured to interact with one or more APIs of an application implemented on a smart phone, tablet, or the like. The GUI component 810 may include a notification service configured to, for example, generate smart phone push notifications if a lock is left unlocked for longer than a threshold amount of time. The GUI component 810 may include a recommended routines engine service configured to use a template mechanism to build routine recommendations to be displayed (e.g., in an application installed on a smart phone, tablet, or the like). The GUI component 810 may include a favorites component configured to provide device lists to be show in a "favorites" section of an application installed on a smart phone, tablet, or the like. The favorites component may also be configured to handle device starter set generation (e.g., call a ML model to determine which devices to show if no custom favorites are defined yet).

The control layer 815 may include an Internet of Things service configured to handle control and state retrieval of smart home devices. The control layer 815 may include a device state store service, which may be a cache of last known state of smart home devices. The control layer 815 may include a user home registry service configured to manage a database of all smart home devices and metadata, such as names, aliases, control routes, appliance types, etc. The control layer 815 may include a device metadata service configured to manage device metadata, such as language and location settings. The control layer 815 may include one or more settings tables, such as a permission and access control table and a favorites table. The control layer may include a device access API usable to provided record of current home configuration. The control layer may include a universal settings service configured to control various settings, such as change language, opt-in settings, etc.

The automations component 820 may include a triggers and sequences component configured to handle routines and other time- or event-triggered actions, such as sleep timers. The automations component 820 may include an arbitration component configured to perform automatic actions (e.g., turning off lights when a user is asleep). The automations component 820 may include a lighting timer service configured to turn lights on and off to present someone is home, as well as being configured to dim lights.

The live model interface 825 may include a targeting/entity resolution component that implements one or more targeting language models that rank entries as targets for home automation voice comments. The live model interface 825 may include a smart home machine learning model service configured to predict anomalies to send as VUI recommendations and/or mobile push recommendations. The live model interface may include a home state prediction component configured to implement an embedding-based model to predict expected home state. The live model interface 825 may include one or more models configured to filter recommendations based on past recommendation responses. The live model interface 825 may include a model endpoint to rank devices to be displayed as favorites for users who have not customized their favorite devices yet.

The streamed data processing component 830 may include a data ingestion service configured to ingest various data from various sources, store the data, and output said data for streamed and offline model processing. The streamed data processing component 830 may include an Internet of Things data warehouse that generates streams of data and performed periodic (e.g., weekly) dumps of data ingested by the data ingestion service. The streamed data processing component 830 may include a signal compute service configured to stream and join different data streams. The streamed data processing component 830 may include a raw activity service configured to compute user activity, such as "all users sleeping" or "someone active in the house. The output of the raw activity service may be used for automatic actions, such as turning off lights when everyone is sleeping. The streamed data processing component 830 may include a smart home automatized activity modeling service configured to compute activity transitions and send change events to subscribers. The streamed data processing component 830 may include a feedback computation service configured to perform feedback computation using sessionized data aggregated across time windows from multiple sources.

The offline model building component 835 may include a secure compute component configured to limit data egress and allow experimentation and computation on sensitive data. The offline model building component 835 may include a scheduler service configured to schedule and run metrics or model update jobs. The offline model building component 835 may include a recommendations metrics job component configured to perform periodic (e.g., daily) recommendations metrics computations and response metrics. The offline model building component 835 may include periodic (e.g., daily) model update components configured to run streamed personalized feature updates. The offline model building component 835 may include a component configured to compute target inference priors (e.g., which devices are typically controlled at which time); a component configured to compute recommendation candidate lists, priors, and device embeddings; a component configured to compute embeddings and device features for favorites and personalized recommended routines; and/or a component configured to compute priors for typical activity by local time of day to be used in activity prediction.

The data storage(s) 840 may include a storage of service data that is consumed by machine learning pipelines to compute metrics, train models, and update per-user features. The data storage(s) 840 may include a segmented offline storage including hidden state data on a per-user level for periodic (e.g., daily) model updaters. The data storage(s) 840 may include one or more database tables for storing per-user and per-device features computed by offline job, to be used in live model inference. The data storage(s) 840 may include a self-service dataset generator that filters, transforms, and joins stream of data into batch-processing-friendly datasets.

As shown in FIGS. 1 and 8, the smart home supporting device(s) 130 may also include the device control application 140, the GSS 145 and the device group storage 165. As described herein, the device control supporting device(s) 135 may be implemented as a skill supporting device(s) 625. When a user input relating to a device group is received via the device control application 140, the smart home supporting device(s) 130 may communicate with one or more skill supporting device(s) 625 to cause operation of a device(s) 110, 112 included in the device group. For example, as described in relation to FIGS. 4 and 5, the smart home supporting device(s) 130 may communicate device group changes to or may receive device group changes from the skill supporting device(s) 625. As another example, the device control application 140 may receive a user input to operate the devices 110, 112 in a device group, where at least a first device 110 of the device group is controlled by the skill 625*a*. In such cases, the smart home supporting device(s) 130 may send data indicative of the user input to the skill 625*a* along with a group identifier used by the skill 625*a* to identify the device group. In response to receiving the data, the skill 625*a* may retrieve device group data associated with the group identifier, and cause operation of the first device included in the device group.

Figure 9:
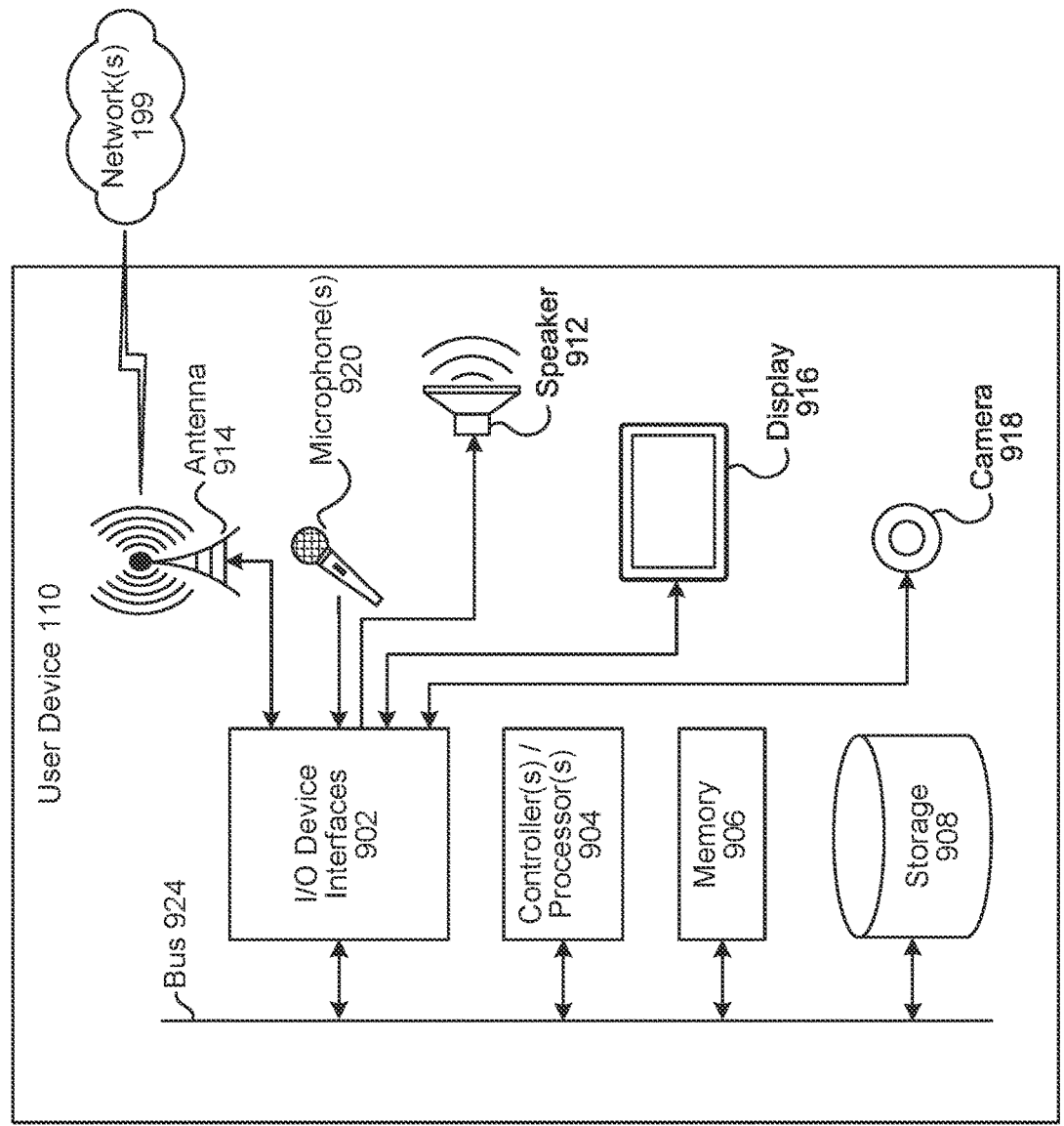
FIG. 9 is a block diagram conceptually illustrating example components of a device, according to embodiments of the present disclosure.
Figure 10:
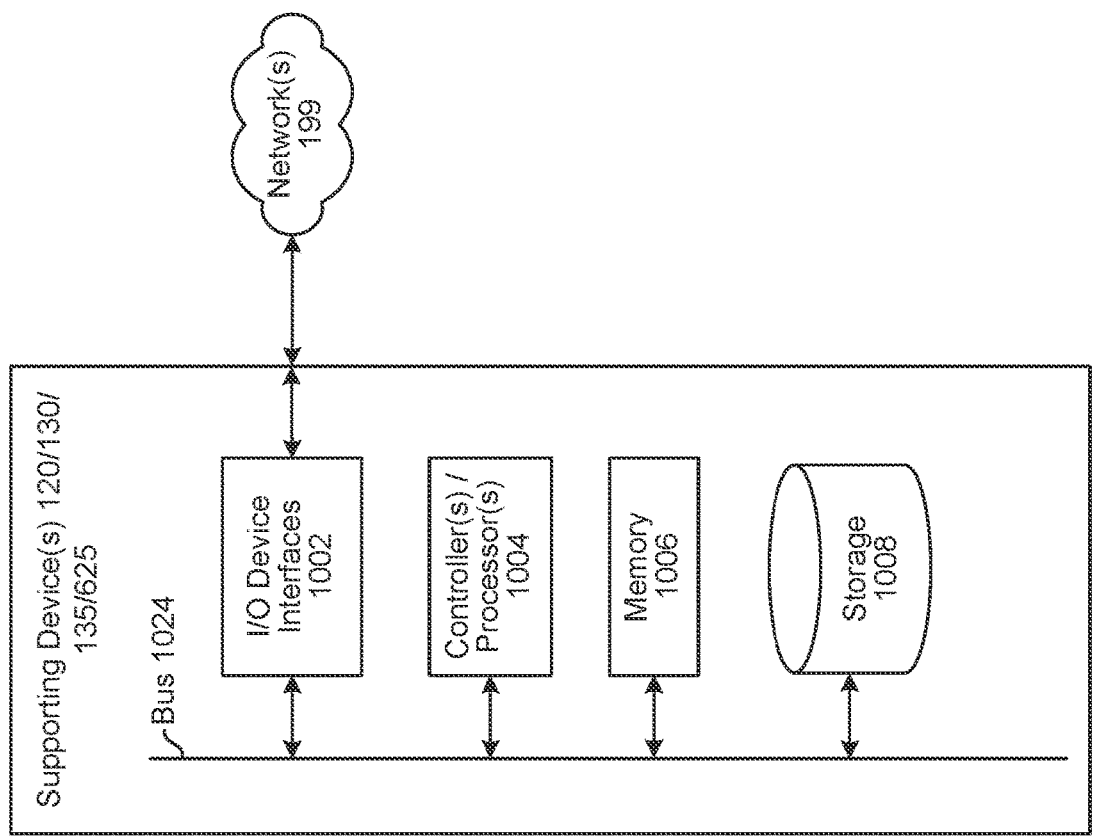
FIG. 10 is a block diagram conceptually illustrating example components of a system, according to embodiments of the present disclosure.

FIG. 9 is a block diagram conceptually illustrating a device 110 that may be used with the supporting device(s) 120 and/or the smart home supporting device(s) 130. FIG. 10 is a block diagram conceptually illustrating example components of a device, such as the supporting device(s) 120, the smart home supporting device(s) 130, the device control supporting device(s) 135, and/or the skill supporting device(s) 625. The supporting device(s) 120, 130, 135, 625 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The supporting device(s) 120, the smart home supporting device(s) 130, the device control supporting device(s) 135, and/or the skill supporting device(s) 625 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple supporting devices 120 may be included in the system 100 of the present disclosure, such as one or more supporting devices 120 for performing ASR processing, one or more supporting devices 120 for performing NLU processing, and one or more skill components, etc. In operation, each of these systems may include computer-readable and computer-executable instructions that reside on the respective supporting device(s) 120, as will be discussed further below.

Each of these devices (110/120/130/135/625) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/130/135/625) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/130/135/625) may also be connected to removable or external non-volatile memory and/or storage (such as a removable memory card, memory key drive, networked storage, etc.) through respective input/output device interfaces (902/1002).

Computer instructions for operating each device (110/120/130/135/625) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/130/135/625) includes input/output device interfaces (902/1002). A variety of components may be connected through the input/output device interfaces (902/1002), as will be discussed further below. Additionally, each device (110/120/130) may include an address/data bus (924/1024) for conveying data among components of the respective device. Each component within a device (110/120/130/135/625) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the supporting device(s) 120, the smart home supporting device(s) 130, and/or the skill supporting device(s) 625 may include their own dedicated processors, memory, and/or storage. Alternatively, one or more of the components of the device 110, the supporting device(s) 120, the smart home supporting device(s) 130, and/or a skill supporting device(s) 625 may utilize the I/O interfaces (902/1002), processor(s) (904/1004), memory (906/1006), and/or storage (908/1008) of the device(s) 110, supporting device(s) 120, the smart home supporting device(s) 130, or the skill supporting device(s) 625, respectively.

As noted above, multiple devices may be employed in a single system. In such a multi-device system, each of the devices may include different components for performing different aspects of the system's processing. The multiple devices may include overlapping components. The components of the device 110, the supporting device(s) 120, the smart home supporting device(s) 130, and the skill supporting device(s) 625, as described herein, are illustrative, and may be located as a stand-alone device or may be included, in whole or in part, as a component of a larger device or system.

Figure 11:
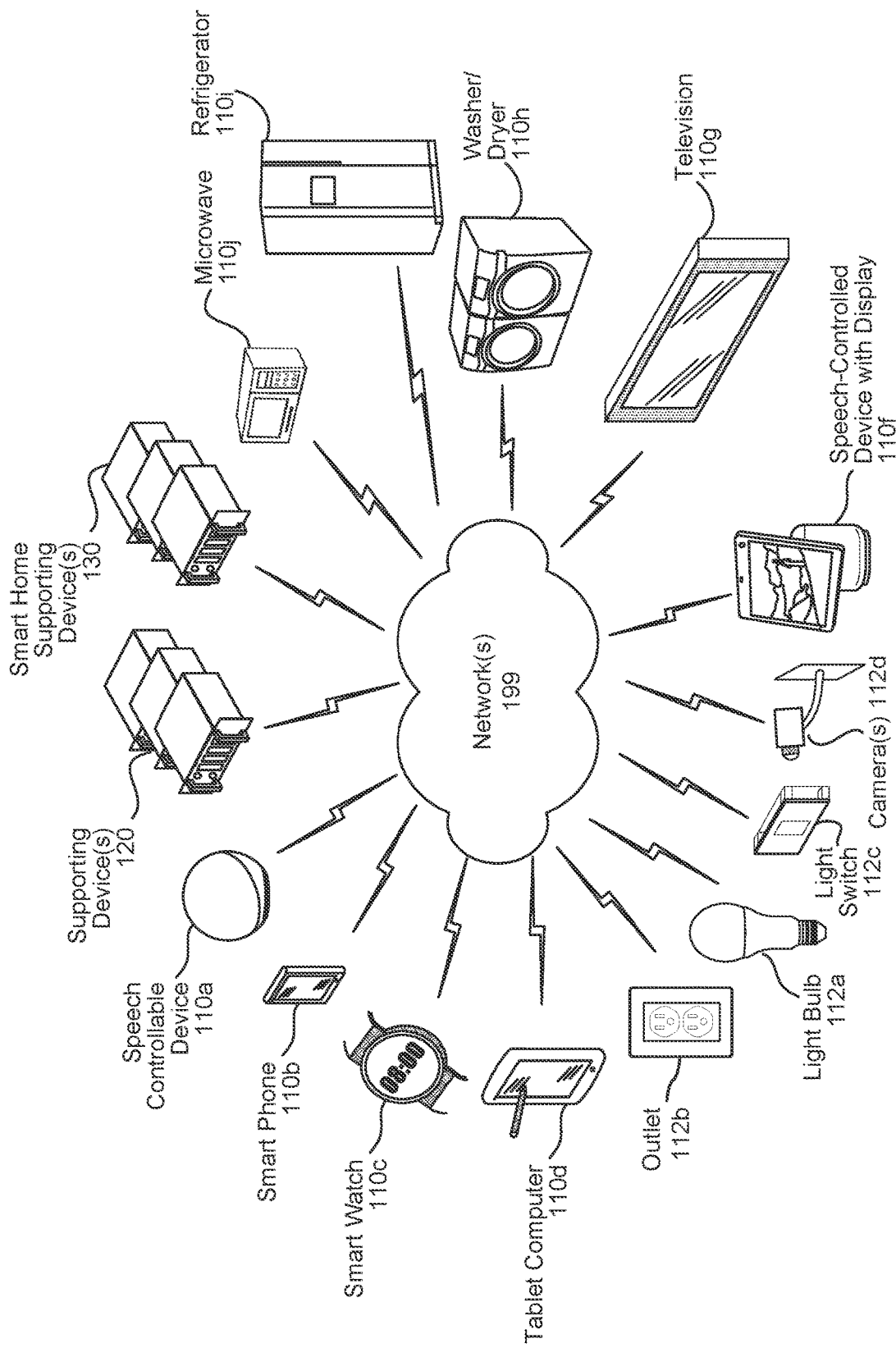
FIG. 11 illustrates an example of a computer network for use with the overall system, according to embodiments of the present disclosure.

As illustrated in FIG. 11, multiple devices may contain components of the system 100 and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a speech-controlled device 110f with a display, a television 110g, a washer/dryer 110h, a refrigerator 110i, a microwave 110j, an outlet 112b, a light bulb 112a, a light switch 112c, and a camera(s) 112d may be connected to the network(s) 199 through a wireless service provider, over a Wi-Fi or cellular network connection, or the like. Other devices that may be connected to the network(s) 199 through either wired or wireless connections include a lock, a fan, a WIFI router, a thermostat, temperature sensor, a garage door, an alarm system, a motion sensor, a contact sensor, a smoke alarm, etc. Other devices are included as network-connected support devices, such as the supporting device(s) 120, the smart home supporting device(s) 130, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, via a first device control application, a first user input associated with a user profile, the first user input representing permission to synchronize at least one device group between at least the first device control application and a second device control application;
   in response to receiving the first user input, receiving, from a data storage component storing first device group information for the first device control application, first device group data including:
      a first device group identifier,
      a first user-provided group name,
      a first device identifier associated with a first device controllable by the first device control application, and
      a second device identifier associated with a second device controllable by the second device control application;
   in response to receiving the first user input, sending, to the second device control application, a first request for second device group information associated with the user profile;
   in response to the first request, receiving, from the second device control application, second device group data including:
      a second device group identifier,
      a second user-provided group name,
      a third device identifier associated with the first device, and
      a fourth device identifier associated with the second device;
   determining that the first device group data corresponds to the second device group data based at least on the first user-provided group name corresponding to the second user-provided group name;
   in response to determining that the first device group data corresponds to the second device group data, determining third device group data including:
      a first record including:
         the first device group identifier,
         the first user-provided group name,
         the first device identifier, and
         the second device identifier, and
      a second record including:
         the second device group identifier,
         the second user-provided group name,
         the third device identifier, and
         the fourth device identifier;
   storing, with the data storage component, the third device group data to enable user control, via the first device control application, of a device group associated with the first user-provided group name, the device group including the first device and the second device; and
   based at least in part on the second device being controllable by the second device control application, sending, to the second device control application, the third device group data, via the second device control application, of the device group.

2. The computer-implemented method of claim 1, wherein the first device group data includes a third device identifier associated with a third device controllable by a third device control application, and wherein the method further comprises:
   sending, to the third device control application, a second request for third device group information associated with the user profile;
   in response to the second request, receiving, from the third device control application, fourth device group data including:
      a third device group identifier,
      a third user-provided group name, and
      a fifth device identifier associated with the third device;
   determining the third device group data to include:
      a third record including:
         the third device group identifier,
         the third user-provided group name, and
         the fifth device identifier; and
   based at least in part on the third device being controllable by the third device control application, sending, to the third device control application, the third record of the third device group data.

3. The computer-implemented method of claim 1, further comprising:
   after storing the third device group data with the data storage component, receiving, via the first device control application, a second user input requesting addition of a third device to the device group associated with the first user-provided group name, wherein the third device is controlled by a third device control application;
   in response to receiving the second user input, receiving, from the data storage component, the third device group data associated with the first user-provided group name;
   determining fourth device group data including:
      the first device group identifier,
      the second device group identifier,
      the first user-provided group name,
      the second user-provided group name,
      the first device identifier,
      the second device identifier,
      the third device identifier,
      the fourth device identifier, and
      a fifth device identifier associated with the third device;
   storing, with the data storage component, the fourth device group data;
   sending, to the second device control application, the fourth device group data;
   sending, to the third device control application, a second request for device group information, the second request including the fourth device group data;
   in response to the second request, receiving, from the third device control application, a third device group identifier used by the third device control application to identify the device group; and
   storing, with the data storage component, the third device group identifier in the fourth device group data.

4. The computer-implemented method of claim 1, further comprising:
- after sending the third device group data to the second device control application, receiving, from the second device control application, a second request to add a third device to the device group associated with the first user-provided group name, the second request including the second device group identifier and a fifth device identifier associated with the third device, the second request being sent in response to the second device control application receiving a second user input associated with the user profile;
- determining, using at least the user profile, that the second device control application is authorized to request modifications to the device group;
- receiving, from the data storage component, the third device group data including the second device group identifier;
- determining fourth device group data including:
  - the first device group identifier,
  - the second device group identifier,
  - the first user-provided group name,
  - the second user-provided group name,
  - the first device identifier,
  - the second device identifier,
  - the third device identifier,
  - the fourth device identifier,
  - the fifth device identifier, and
  - a sixth device identifier used by the first device control application to identify the third device;
- storing, with the data storage component, the fourth device group data; and
- sending, to the second device control application and in response to the second request, data indicating completion of the second request.

5. A computer-implemented method comprising:
- receiving first input data associated with a user profile and representing permission to synchronize device group information across different device control applications;
- in response to receiving the first input data, sending, to a first device control application, a first request for device group information associated with the user profile;
- in response to the first request, receiving, from the first device control application, first device group data associated with a first device;
- receiving, from a data storage component, second device group data associated with a second device control application and with the first device and a second device;
- in response to receiving the first input data, sending, to a third device control application, a second request for device group information associated with the user profile;
- in response to the second request, receiving, from the third device control application, third device group data associated with a third device;
- processing the first device group data, the second device group data and the third device group data to determine fourth device group data associated with the first device, the second device and the third device;
- sending, to the first device control application, the fourth device group data associated with the first device;
- sending, to the third device control application, the fourth device group data associated with the third device; and
- storing, with the data storage component, the fourth device group data to enable user control of a device group using the second device control application.

6. The computer-implemented method of claim 5, wherein the first device group data includes a first user-provided group name, the second device group data includes a second user-provided group name, and wherein processing the first device group data and the second device group data comprises:
- determining that the first user-provided group name corresponds to the second user-provided group name;
- based at least in part on the first user-provided group name corresponds to the second user-provided group name, determining that the first device group data corresponds to the second device group data; and
- based at least in part on determining that the first device group data corresponds to the second device group data, determining the fourth device group data further including the first user-provided group name.

7. The computer-implemented method of claim 5, wherein processing the first device group data and the second device group data comprises:
- determining that the first device corresponds to the third device;
- based at least in part on determining that the first device corresponds to the third device, determining that the first device group data corresponds to the third device group data; and
- based at least in part on determining that the first device group data corresponds to the third device group data, determining the fourth device group data to include first data corresponding to the first device and second data corresponding to the third device.

8. The computer-implemented method of claim 5, wherein processing the first device group data and the second device group data comprises:
- determining that a first set of devices associated with the first device group data corresponds to a first portion of a second set of devices associated with the second device group data;
- determining that a second portion of the second set of devices are different than the first set of devices; and
- determining the fourth device group data to include the first set of devices and the second portion of the second set of devices.

9. The computer-implemented method of claim 5, further comprising:
- receiving second input data associated with the user profile, the second input data representing a modification to the fourth device group data;
- in response to receiving the second input data, determining fifth device group data by modifying the fourth device group data according to the second input data;
- storing, with the data storage component, the fifth device group data to enable user control of a second device group using the second device control application; and
- sending, to the first device control application, the fifth device group data to enable user control of the second device group using the first device control application.

10. The computer-implemented method of claim 9, further comprising:
- determining that the fifth device group data includes a fourth device controlled by the third device control application; and
- in response to determining that the fourth device is controlled by the third device control application, sending the fifth device group data to the third device control application to enable user control of the second device group using the third device control application.

11. The computer-implemented method of claim 5, further comprising:
after sending the fourth device group data to the second device control application, receiving, from the second device control application, a third request to add a fourth device to a device group associated with the fourth device group data;
determining, using at least the user profile, that the second device control application is authorized to request modifications to the device group;
receiving, from the data storage component, the fourth device group data;
determining, using at least the fourth device group data, fifth device group data associated with the first device, the second device, the third device and the fourth device;
storing, with the data storage component, the fifth device group data; and
sending, to the second device control application and in response to the third request, data indicating completion of the third request.

12. The computer-implemented method of claim 5, further comprising:
determining the fourth device group data to include:
a group identifier,
first data associated with the first device, wherein the first device is controllable by the first device control application,
second data associated with the second device, and
third data associated with the third device, wherein the third device is controllable by the third device control application;
wherein sending the fourth device group data to the first device control application comprises sending the group identifier and the first data based at least in part on the first device being controllable by the first device control application, and
wherein sending the fourth device group data to the third device control application comprises sending the group identifier and the third data based at least in part on the third device being controllable by the third device control application.

13. A system comprising:
at least one processor; and
at least one memory including instructions that, when executed by the at least one processor, cause the system to:
receive first input data associated with a user profile and representing permission to synchronize device group information across different device control applications;
in response to receiving the first input data, send, to a first device control application, a first request for device group information associated with the user profile;
in response to the first request, receive, from the first device control application, first device group data associated with a first device;
receive, from a data storage component, second device group data associated with a second device control application and with the first device and a second device;
in response to receiving the first input data, send, to a third device control application, a second request for device group information associated with the user profile;
in response to the second request, receive, from the third device control application, third device group data associated with a third device;
process the first device group data, the second device group data and the third device group data to determine fourth device group data associated with the first device, the second device and the third device;
send, to the first device control application, the fourth device group data associated with the first device;
send, to the third device control application, the fourth device group data associated with the third device; and
store, with the data storage component, the fourth device group data to enable user control of a device group using the second device control application.

14. The system of claim 13, wherein the first device group data includes a first user-provided group name, the second device group data includes a second user-provided group name, and wherein the at least one memory includes further instructions that, when executed by the at least one processor, further cause the system to:
determine that the first user-provided group name corresponds to the second user-provided group name;
based at least in part on the first user-provided group name corresponds to the second user-provided group name, determine that the first device group data corresponds to the second device group data; and
based at least in part on determining that the first device group data corresponds to the second device group data, determine the fourth device group data further including the first user-provided group name.

15. The system of claim 13, wherein the at least one memory includes further instructions that, when executed by the at least one processor, further cause the system to:
determine that the first device corresponds to the third device;
based at least in part on determining that the first device corresponds to the third device, determine that the first device group data corresponds to the third device group data; and
based at least in part on determining that the first device group data corresponds to the third device group data, determine the fourth device group data to include first data corresponding to the first device and second data corresponding to the third device.

16. The system of claim 13, wherein the at least one memory includes further instructions that, when executed by the at least one processor, further cause the system to:
determine that a first set of devices associated with the first device group data corresponds to a first portion of a second set of devices associated with the second device group data;
determine that a second portion of the second set of devices are different than the first set of devices; and
determine the fourth device group data to include the first set of devices and the second portion of the second set of devices.

17. The system of claim 13, wherein the at least one memory includes further instructions that, when executed by the at least one processor, further cause the system to:
receive second input data associated with the user profile, the second input data representing a modification to the fourth device group data;

in response to receiving the second input data, determine fifth device group data by modifying the fourth device group data according to the second input data;

store, with the data storage component, the fifth device group data to enable user control of a second device group data using the second device control application; and send, to the first device control application, the fifth device group data to enable user control of the second device group data using the first device control application.

18. The system of claim 17, wherein the at least one memory includes further instructions that, when executed by the at least one processor, further cause the system to:

determine that the fifth device group data includes a fourth device controlled by the third device control application; and in response to determining that the fourth device is controlled by the third device control application, send the fifth device group data to the third device control application to enable user control of the second device group data using the third device control application.

19. The system of claim 13, wherein the at least one memory includes further instructions that, when executed by the at least one processor, further cause the system to:

after sending the fourth device group data to the second device control application, receive, from the second device control application, a third request to add a fourth device to a device group associated with the fourth device group data;

determine, using at least the user profile, that the second device control application is authorized to request modifications to the device group;

receive, from the data storage component, the fourth device group data;

determine, using at least the fourth device group data, fifth device group data associated with the first device, the second device, the third device and the fourth device;

store, with the data storage component, the fifth device group data; and send, to the second device control application and in response to the third request, data indicating completion of the third request.

20. The system of claim 13, wherein the at least one memory includes further instructions that, when executed by the at least one processor, further cause the system to:

determine the fourth device group data to include:
a group identifier;
first data associated with the first device, wherein the first device is controllable by the first device control application,
second data associated with the second device, and
third data associated with the third device, wherein the third device is controllable by the third device control application;

wherein the instructions that cause the system to send the fourth device group data to the first device control application further comprises instructions to send the group identifier and the first data based at least in part on the first device being controllable by the first device control application, and wherein the instructions that cause the system to send the fourth device group data to the third device control application further comprises instructions to send the group identifier and the third data based at least in part on the third device being controllable by the third device control application.

\* \* \* \* \*